(12) United States Patent
Lai et al.

(10) Patent No.: US 11,675,153 B2
(45) Date of Patent: Jun. 13, 2023

(54) LENS ASSEMBLY

(71) Applicant: Rays Optics Inc., Hsinchu (TW)

(72) Inventors: Ching-Lung Lai, Hsinchu (TW); Hung-You Cheng, Hsinchu (TW); Kuo-Chuan Wang, Hsinchu (TW)

(73) Assignee: RAYS OPTICS INC., Hsinchu (TW)

( * ) Notice: Subject to any disclaimer, the term of this patent is extended or adjusted under 35 U.S.C. 154(b) by 486 days.

(21) Appl. No.: 16/386,404

(22) Filed: Apr. 17, 2019

(65) Prior Publication Data
US 2020/0003986 A1 Jan. 2, 2020

(30) Foreign Application Priority Data

Jun. 28, 2018 (TW) .................................. 107122337
Nov. 20, 2018 (TW) .................................. 107141268

(51) Int. Cl.
*G02B 7/02* (2021.01)
*G02B 13/06* (2006.01)
*G02B 9/64* (2006.01)
*H04N 23/55* (2023.01)

(52) U.S. Cl.
CPC .............. *G02B 7/021* (2013.01); *G02B 9/64* (2013.01); *G02B 13/06* (2013.01); *H04N 23/55* (2023.01)

(58) Field of Classification Search
CPC .......... G02B 7/021; G02B 9/64; G02B 13/06; H04N 5/2254
USPC ......................................................... 359/819
See application file for complete search history.

(56) References Cited

U.S. PATENT DOCUMENTS

2018/0120544 A1* 5/2018 Chiang .................... G02B 9/62

* cited by examiner

*Primary Examiner* — Marin Pichler
*Assistant Examiner* — Mitchell T Oestreich
(74) *Attorney, Agent, or Firm* — Muncy, Geissler, Olds & Lowe, P.C.

(57) ABSTRACT

A lens including 6~11 lenses with a refractive power is provided. A spherical lens and an aspheric lens are disposed between the aperture and the image plane of the lens assembly. At least two lenses are disposed between the aperture and the object side of the lens assembly. EFL is the effective focal length of the lens. LT is the length on the optical axis of the lens from the lens surface farthest from the image plane of the lens assembly to the lens surface closest to the image plane of the lens assembly. The lens assembly satisfies the following conditions: 3 mm<EFL<5 mm, 0.1<EFULT<0.25.

15 Claims, 21 Drawing Sheets

LENS ASSEMBLY

This application claims the benefit of Taiwan application Serial No. 107122337, filed Jun. 28, 2018 and the benefit of Taiwan application Serial No. 107141268, filed Nov. 20, 2018, the subject matter of which are incorporated herein by reference.

BACKGROUND OF THE INVENTION

Field of the Invention

The invention relates in general to a lens assembly.

Description of the Related Art

Along with the development in technology, the variety of lenses is getting more and more diversified. The lens used in vehicles is a commonly seen lens. Currently, higher and higher requirements, such as thinness and better optical features, are expected of the lens. To satisfy the said requirements, the lens basically needs to possess the features of lower cost, higher resolution, larger aperture, wider view angle, larger target surface and lighter weight. Therefore, it has become a prominent task for the industries to provide an image lens having the features of lighter weight, lower manufacturing cost and better optical quality.

The description of related art is provided to facilitate the understanding of the present invention. Therefore, the contents disclosed in the related art may include some technologies not generally known to anyone ordinarily skilled in the technology field of the present invention. The contents disclosed in the related art and the problems that one or more than one embodiment of the present invention aims to resolve are not necessarily known to or acknowledged by anyone ordinarily skilled in the technology field of the present invention before the application of the present invention is filed.

SUMMARY OF THE INVENTION

Other objects and advantages of the present invention can be understood from the technical features disclosed in the embodiments of the present invention.

According to one embodiment the present invention, a lens assembly including an aperture, wherein a spherical lens and an aspheric lens are disposed between the aperture and the image plane of the lens assembly; at least two lenses are disposed between the aperture and the object side of the lens assembly; the quantity of the lenses with a refractive power is greater than 6 but less than 12; DL is the distance, in a direction perpendicular to an optical axis, between two edge turning points at the two ends of the optical axis of a lens surface with a refractive power closest to the image plane of the lens assembly; LT is the length on the optical axis of the lens from the lens surface farthest from the image plane of the lens assembly to the lens surface closest to the image plane of the lens assembly. The lens assembly satisfies the following conditions: 6 mm<DL<20 mm, 0.3<DL/LT<0.6.

According to another embodiment the present invention, a lens assembly including an aperture, wherein a spherical lens and an aspheric lens are disposed between the aperture and the image plane of the lens assembly; at least two lenses are disposed between the aperture and the object side of the lens assembly; the quantity of the lenses with a refractive power is greater than 5 but less than 12; EFL is the effective focal length of the lens assembly; LT is the length on the optical axis of the lens from the lens surface farthest from the image plane of the lens assembly to the lens surface closest to the image plane of the lens assembly. The lens assembly satisfies the following conditions: 3 mm<EFL<5 mm, 0.1 <EF/LT<0.25.

Through the design disclosed in the embodiments of the present invention, an image lens having the features of lightweight, lower manufacturing cost and better optical quality is provided. Based on that design that the optical lens assembly includes 6~11 lenses and that the distance (TTL) from the lens to the sensor is less than 30 mm, the optical lens assembly advantageously possesses the features of larger aperture, higher resolution, lighter weight, wider view angle, and larger target surface, the manufacturing cost can be reduced and the optical quality can be improved.

The above and other aspects of the present invention will become better understood with regard to the following detailed description of the preferred but non-limiting embodiment (s). The following description is made with reference to the accompanying drawings.

DETAILED DESCRIPTION OF THE PRESENT INVENTION

The technical contents, features, and effects of the present invention are disclosed below in a number of embodiments with accompanying drawings. Directional terms such as above, under, left, right, front or back are used in the following embodiments to indicate the directions of the accompanying drawings, not for limiting the present invention. Moreover, ordinal numbers, such as "the first", "the second", and "the third", are used in the following embodiments to clearly distinguish the elements having the same designations, not for limiting the elements.

The optical elements in the present invention refer to the elements partly or completely of reflective or transmissive materials normally including glass or plastics. Examples of the optical elements include lens, prism or aperture.

When the lens is used in an image system, the image magnification side refers to the side of the lens assembly closer to a target object on the optical path, and the image reduction side refers to the side of the lens assembly closer to the light sensing element on the optical path.

Figure 1:
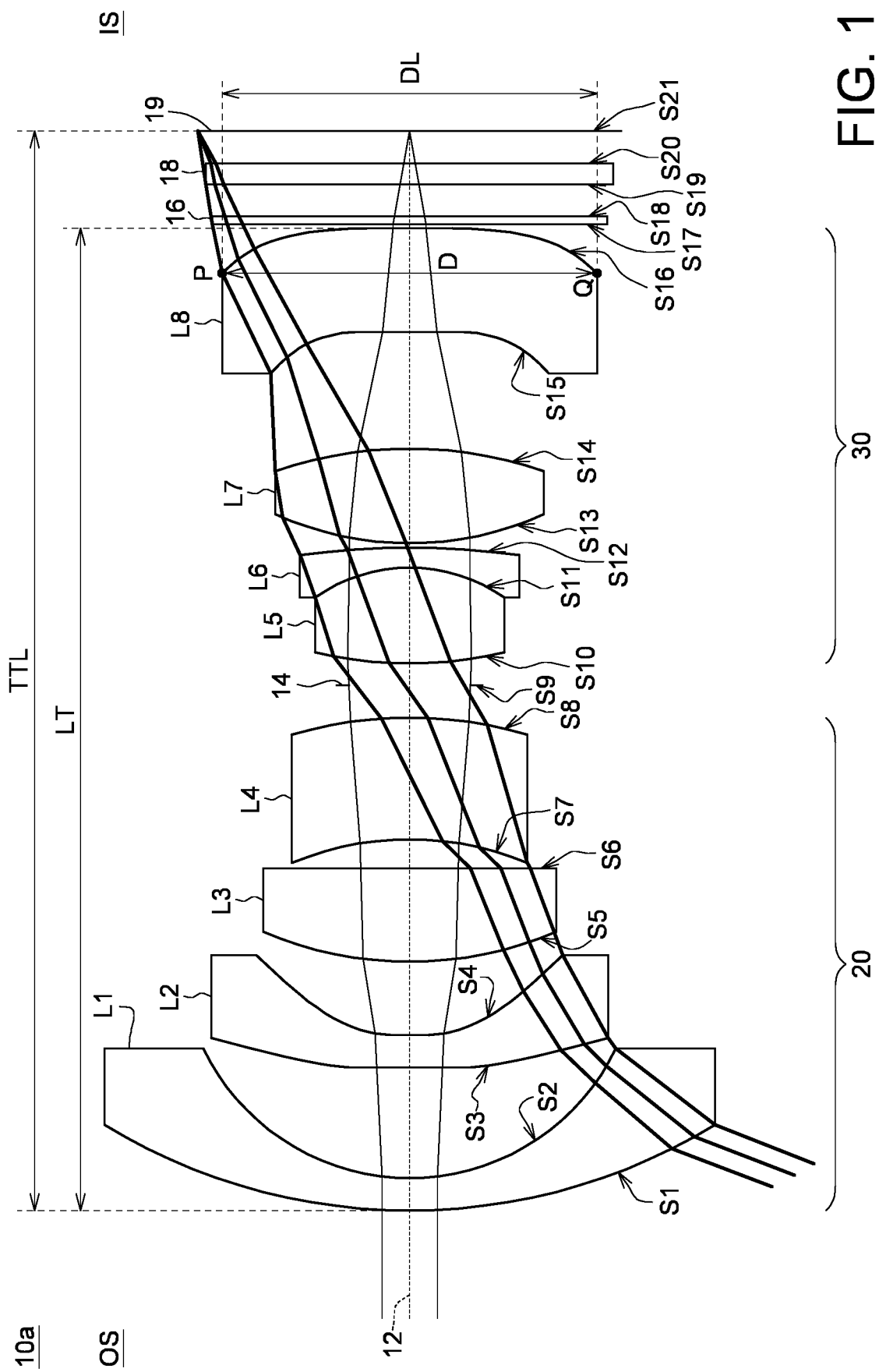
FIG. 1 is a schematic diagram of a lens assembly 10a according to an embodiment of the present invention.
Figure 2:
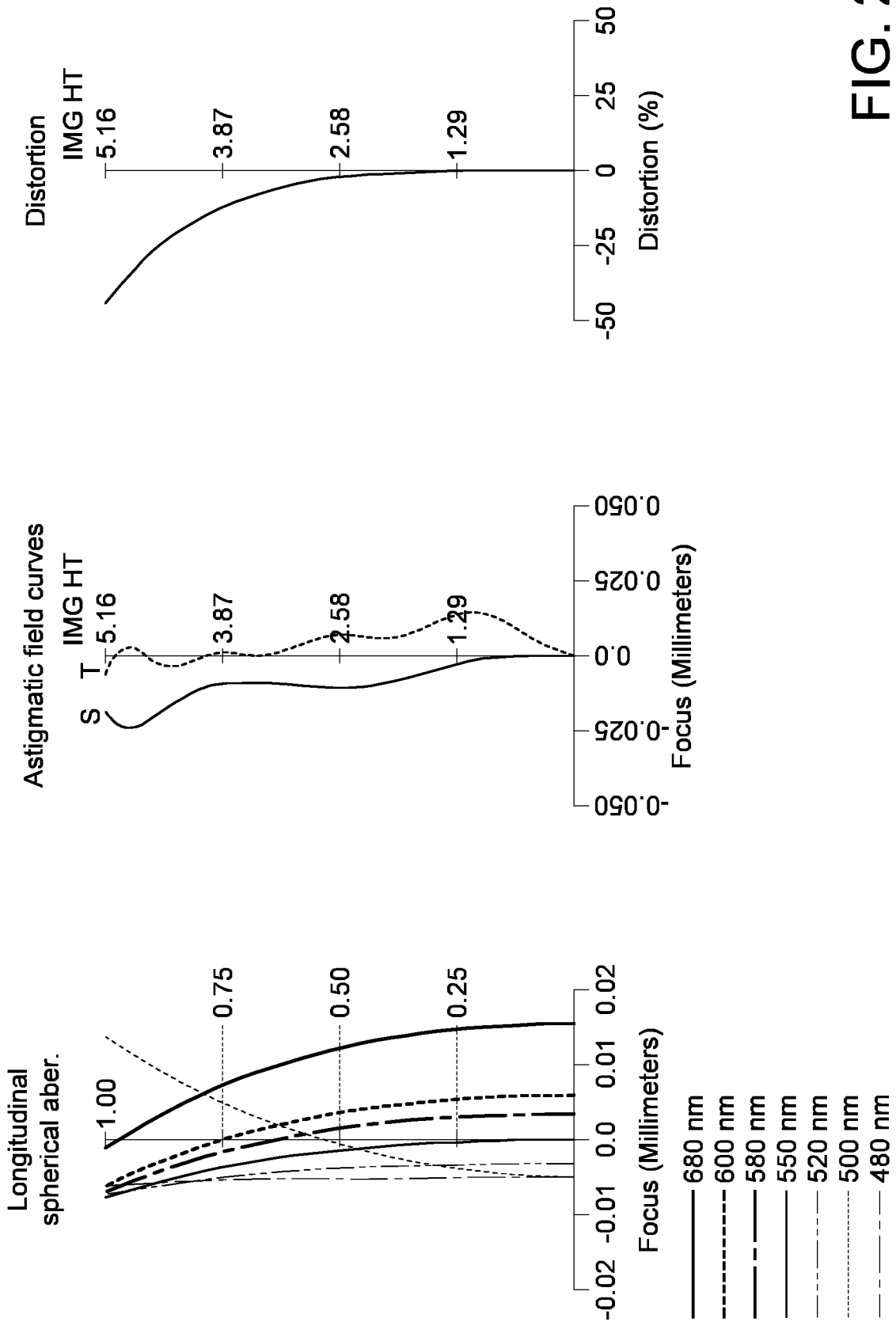
FIGS. 2~3 respectively are graphs of spherical aberration, astigmatic field and optical distortion of the lens assembly 10a and a characteristic graph of spectrum modulation conversion of a visible light.
Figure 3:
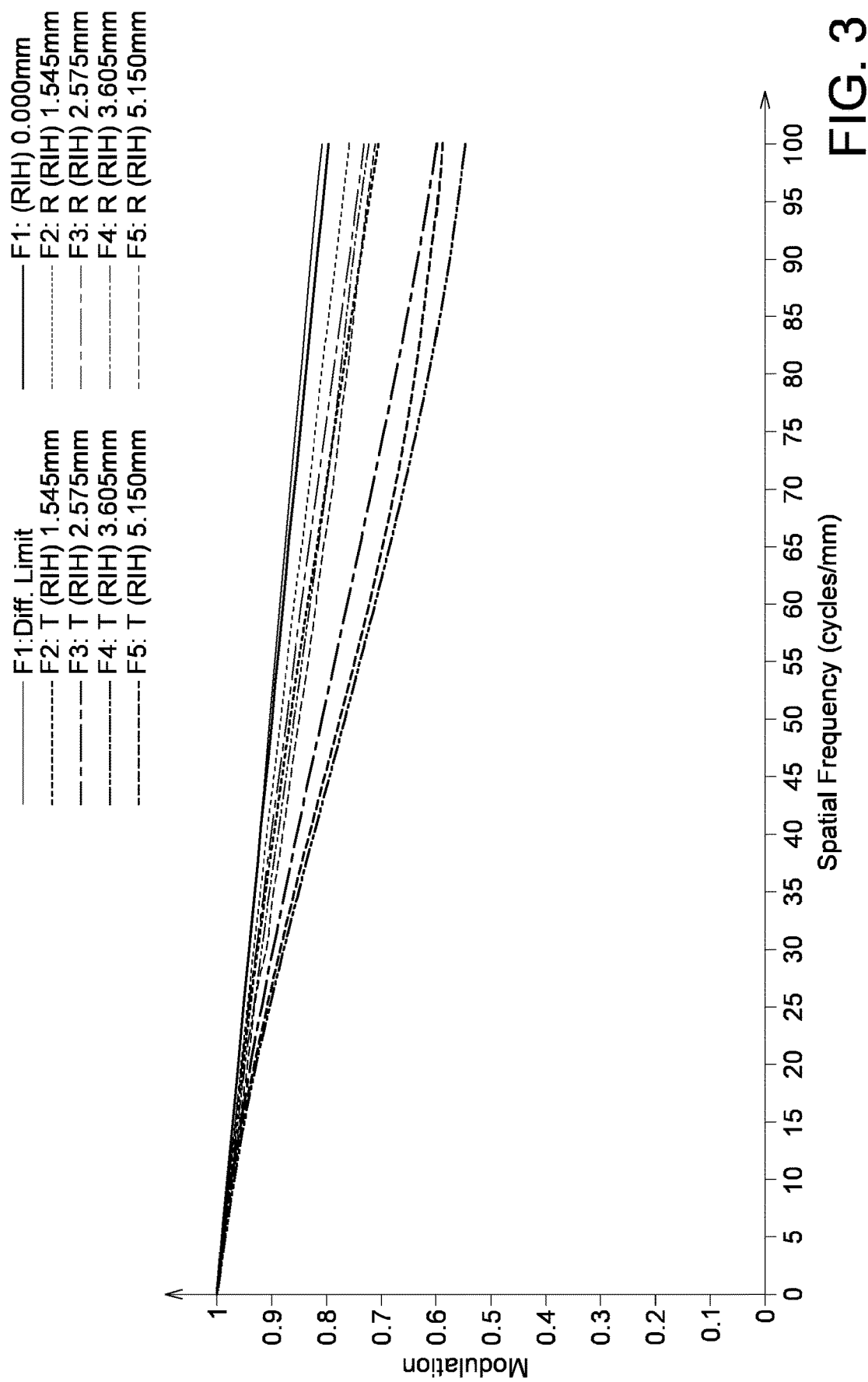

FIG. 1 is a schematic diagram of a lens assembly 10a according to an embodiment of the present invention. Refer to FIG. 1. In the present embodiment, the lens assembly 10a includes a lens barrel (not illustrated), within which a first lens L1, a second lens L2, a third lens L3, a fourth lens L4, an aperture 14 and a fifth lens L5, a sixth lens L6, a seventh lens L7 and an eighth lens L8 are arranged from a first side (the image magnification side OS) to a second side (the image reduction side IS). The first lens L1, the second lens L2, the third lens L3 and the fourth lens L4 together form a first lens group (such as the front group) 20 with a negative refractive power. The fifth lens L5, the sixth lens L6, the seventh lens L7 and the eighth lens L8 together form a second lens group (such as the rear group) 30 with a positive refractive power. Moreover, a filter 16, a glass cover 18 and an image sensor (not illustrated) are disposed on the image reduction side IS. The image plane of the lens assembly 10a of a visible light at an effective focal length is designated by 19. The filter 16 and the glass cover 18 are disposed between the second lens group 30 and the image plane 19 of the lens assembly 10a of a visible light at an effective focal length. In the present embodiment, the refractive powers of the first lens L1 to the eighth lens L8 sequentially are: negative, negative, positive, negative, positive, negative, positive, positive, and both the second lens and the eighth lens are aspheric glass lenses. In an embodiment, aspheric glass lenses can be replaced by aspheric plastics lenses. Additionally, the lenses whose adjacent surfaces have substantially identical radius of curvature (the difference in the radius of curvature is less than 0.005 mm) or completely identical radius of curvature can form a combined lens, a glued lens, a doublet lens or a triplet lens. In the present embodiment, the fifth lens L5 and the sixth lens L6 form a combined lens, but the present invention is not limited thereto. In each diagram of each embodiment of the present invention, the image magnification side OS is located at the left-hand side, the image reduction side IS is located at the right-hand side, and the similarities are not repeated here.

In the present invention, the aperture 14 refers to an aperture stop.

The aperture is an independent element or is integrated in other optical elements. In the present embodiment, the aperture achieves a similar effect by blocking the light on the peripheral part using a mechanism member but keeping the central part permeable to the light. The said mechanism member can be adjustable, which means the position, shape and transparency of the mechanism member can be adjusted. Or, the aperture can limit the optical path by coating an opaque light absorbing material on the surface of the lens but keeping the central part permeable to the light.

Each lens has a surface diameter. As indicated in FIG. 1, the surface diameter of a lens refers to the distance (such as surface diameter D), in a direction perpendicular to an optical axis, between two edge turning points P and Q at the two ends of the optical axis 12 of the lens. In the present embodiment, the surface S1 has a diameter of about 14.94 mm, and the surface S16 has a diameter of 9.22 mm.

The design parameters, shapes and aspheric coefficients of the lens assembly 10a are listed in Table 1 and Table 2. In a design example of the present invention, the aspheric polynomial can be expressed as:

$$Z = \frac{cr^2}{1+\sqrt{1-(1+k)c^2r^2}} + Ar^4 + Br^6 + Cr^8 + Dr^{10} + Er^{12} + Fr^{14} + \ldots \quad (1)$$

In the formula (1), Z represents a sag along the direction of the optical axis; c represents a reciprocal of the radius of an osculating sphere, that is, the reciprocal of the radius of curvature close to the optical axis; k represents a conic coefficient; r represents an aspheric height, that is, the height from the center to the edge of the lens. In Table 2, columns A-G respectively represent the values of the coefficients of the 4th, the 6th, the 8th, the 10th, the 12th, the 14th, the 16th, the 18th, and the 20th order terms of the spherical polynomial. However, the data exemplified below are not for limiting the present invention. Any person ordinary skilled in the technology field can make necessary modifications or adjustments to the parameters or setting of the present invention, and the said modifications or adjustments are still within the scope of the present invention.

TABLE 1

F/# = 2.72; TTL = 26.54 (mm); LT = 24.13 (mm)
EFL = 3.64 (mm); FOV = 138°; DL/LT = 0.382
D1/DL = 1.621; IMH = 5.15 (mm); EFL/LT = 0.151

| Surface | Radius of curvature (mm) | Interval (mm) | Refractive power | Abbe number | Element |
|---|---|---|---|---|---|
| S1 | 14.27 | 0.80 | 1.73 | 54.67 | L1 (convex-concave) |
| S2 | 5.59 | 2.71 | | | |
| S3* | −199.10 | 0.80 | 1.67 | 54.78 | L2 (aspheric) |
| S4* | 4.90 | 1.78 | | | |
| S5 | 8.73 | 2.29 | 2.00 | 29.13 | L3 (plano-convex) |
| S6 | INF. | 0.72 | | | |
| S7 | −7.37 | 3.00 | 1.50 | 81.61 | L4 (convex-concave) |
| S8 | −10.29 | 0.81 | | | |
| S9 | INF. | 0.54 | | | Aperture 14 |
| S10 | 10.44 | 2.36 | 1.60 | 65.46 | L5 (bi-convex) |
| S11 | −3.88 | 0.50 | 1.72 | 29.51 | L6 (convex-concave) |
| S12 | −17.90 | 0.10 | | | |
| S13 | 8.21 | 2.30 | 1.50 | 81.61 | L7 (bi-convex) |
| S14 | −10.33 | 2.88 | | | |
| S15* | −30.34 | 2.53 | 1.81 | 40.65 | L8 (aspheric) |
| S16* | −79.04 | 0.10 | | | |
| S17 | INF. | 0.21 | 1.52 | 64.14 | Filter 16 |
| S18 | INF. | 0.78 | | | |
| S19 | INF. | 0.50 | 1.52 | 54.49 | Glass cover 18 |
| S20 | INF. | 0.83 | | | |
| S21 | | | | | Image plane 19 |

TABLE 2

|   | S3* | S4* | S15* | S16* |
|---|---|---|---|---|
| k | 46.70 | 0.46 | 22.85 | −15.93 |
| A | 1.05E−02 | 1.04E−02 | −4.45E−03 | −3.41E−04 |
| B | −1.74E−03 | −1.58E−03 | −4.74E−05 | −2.31E−04 |
| C | 2.15E−04 | 1.66E−05 | −6.13E−05 | 1.61E−05 |
| D | −1.96E−05 | 4.14E−05 | 1.37E−05 | −7.73E−07 |
| E | 1.24E−06 | −9.56E−06 | −1.64E−06 | 1.78E−08 |
| F | −5.33E−08 | 1.10E−06 | 9.67E−08 | −2.04E−11 |
| G | 1.47E−09 | −7.24E−08 | −2.16E−09 | −3.70E−12 |
| H | −2.33E−11 | 2.61E−09 | 0 | 0 |
| I | 1.62E−13 | −4.00E−11 | 0 | 0 |

The interval of the surface S1 is the distance on the optical axis 12 from the surface S1 to the surface S2. The interval of the surface S2 is the distance on the optical axis 12 from the surface S2 to the surface S3. The interval of the surface S20 is the distance on the optical axis 12 from the surface S20 to the image plane 19 of a visible light at an effective focal length.

In the tables, the surface with a * sign is an aspheric surface, and the surface without the * sign is a spherical surface.

The radius of curvature refers to the reciprocal of the curvature. When the radius of curvature is positive, the sphere center of the lens surface is located at the image reduction side of the lens assembly. When the radius of curvature is negative, the sphere center of the lens surface is located at the image magnification side of the lens assembly. The concavity and convexity of each lens are listed in above tables.

The aperture value of the present invention is represented by F/# as indicated in above tables. When the lens of the present invention is used in a projection system, the image plane is a light valve surface. When the lens is used in an image lens system, the image plane refers to the surface of the light sensing element.

When the lens is used in an image lens system, the image height IMH is ½ of the length of the image circle on the image plane as indicated in above tables.

In the present invention, the total length of the lenses is represented by LT as indicated in above tables. To be more specifically, in the present embodiment, the total length refers to the distance on the optical axis 12 of the lens assembly 10a from the optical surface S1 closest to the image magnification side to the optical surface S16 closest to the image reduction side. The total length (LT) of the lens is less than 25 mm. In the present invention, the total length from the lens to the image plane 19 is represented by TTL as indicated in above tables. To be more specifically, in the present embodiment, the total length from the lens to the image plane 19 refers to the distance on the optical axis 12 of the lens assembly 10a from the optical surface S1 closest to the image magnification side to the image plane 19 of the lens.

In the present embodiment, the full field of view FOV refers to the receiving angle of the optical surface S1 closest to the image magnification end, that is, the field of view measured using the image circle as indicated in above tables. In the embodiments of the present invention, the full field of view FOV satisfies: 130°<FOV<150°.

The lens assembly according to an embodiment of the present invention includes a front lens group and a rear lens group. The front group includes two lenses with a negative refractive power, wherein one of the two lenses is an aspheric lens for achieving a light harvesting capacity at a wide angle, but the present invention is not limited thereto. The aperture value of the lens is greater than or equivalent to 2.6. The rear group includes a combined lens (a glued lens or a doublet lens) and an aspheric lens for correcting aberration and color difference. The minimum distance between the two lenses of the doublet lens along the optical axis is less than 0.05 mm. The doublet lens can be replaced by a triplet lens, but the present invention is not limited thereto. Each of the doublet lens, the glued lens, the combined lens, and the triplet lens has corresponding adjacent surfaces whose radii of curvature are substantially identical or similar. The lens assembly includes 6~11 lenses with a refractive power, and at least two lenses have an Abbe number greater than 60. The glued lens of the front group or the rear group includes at least one lens whose Abbe number is greater than 60.

In an embodiment, the lens assembly satisfies the following condition: 6 mm<DL<20 mm. In another embodiment, the lens assembly satisfies the following condition: 6.5 mm<DL<19 mm. In an alternate embodiment, the lens assembly satisfies the following condition: 7 mm<DL<18 mm. DL represents the diameter of a lens surface closest to the image plane of the lens assembly, so that the imaging light entering the lens can converge to be near the size of the image sensor, and a better optical effect can be obtained in a finite space.

In an embodiment, the lens assembly satisfies the following conditions: 0.3<DULT<0.6. In another embodiment, the lens assembly satisfies the following conditions: 0.32<DULT<0.58. In an alternate embodiment, the lens assembly satisfies the following condition: 0.34<DULT<0.56. Thus, the image sensor corresponds to a better design range of the total length of the lenses. DL is the diameter of a lens surface closest to the image plane of the lens assembly. LT is the distance on the optical axis from optical surface lens closest to the image magnification side to the optical surface closest to the image reduction side.

In an embodiment, the lens assembly satisfies the following conditions: 3 mm<EFL<5 mm and 0.1 <EFULT<0.25. In another embodiment, the lens assembly satisfies the following conditions: 3 mm<EFL<5 mm and 0.11<EFULT<0.24. In an alternate embodiment, the lens assembly satisfies the following conditions: 3 mm<EFL<5 mm and 0.12<EFULT<0.23. Thus, a better design range of effective focal length and total length can be provided. EFL is the effective focal length of the lens. LT is the distance on the optical axis from the optical surface of the lens closest to the image magnification side to the optical surface closest to the image reduction side.

Figure 4:
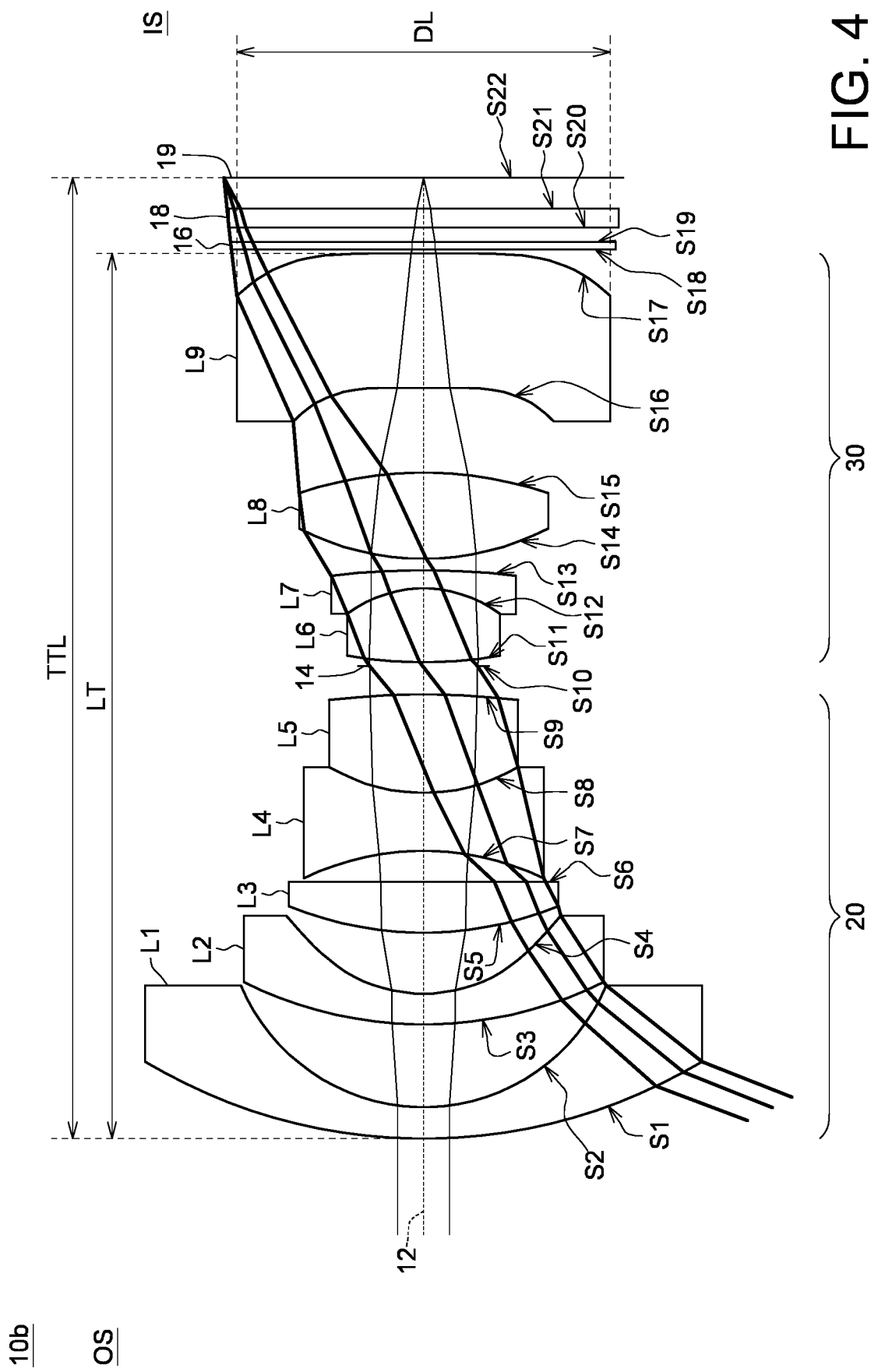
FIG. 4 is a schematic diagram of a lens assembly 10b according to an embodiment of the present invention.
Figure 5:
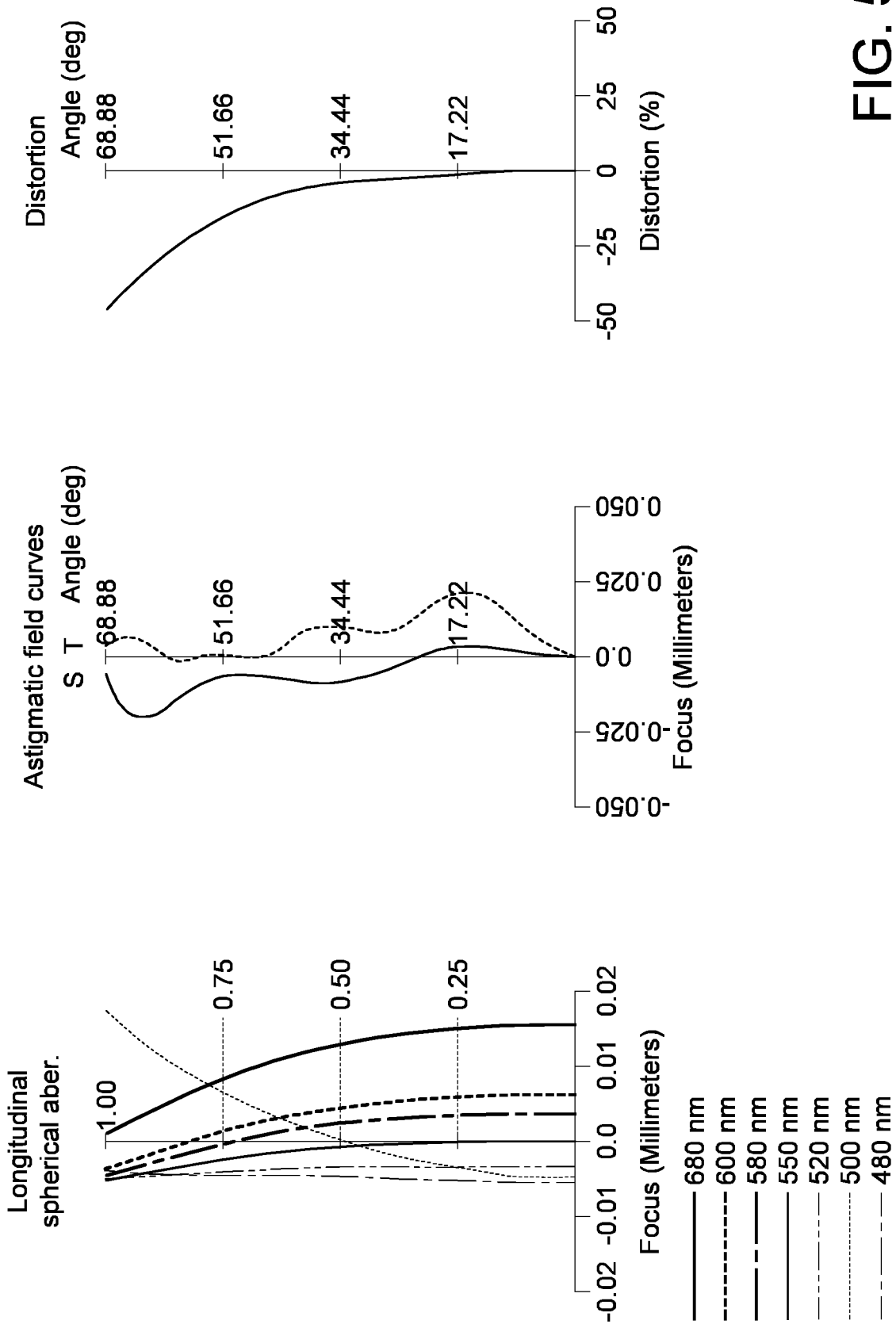
FIGS. 5~6 respectively are graphs of spherical aberration, astigmatic field and optical distortion of the lens assembly 10b and a characteristic graph of spectrum modulation conversion of a visible light.
Figure 6:
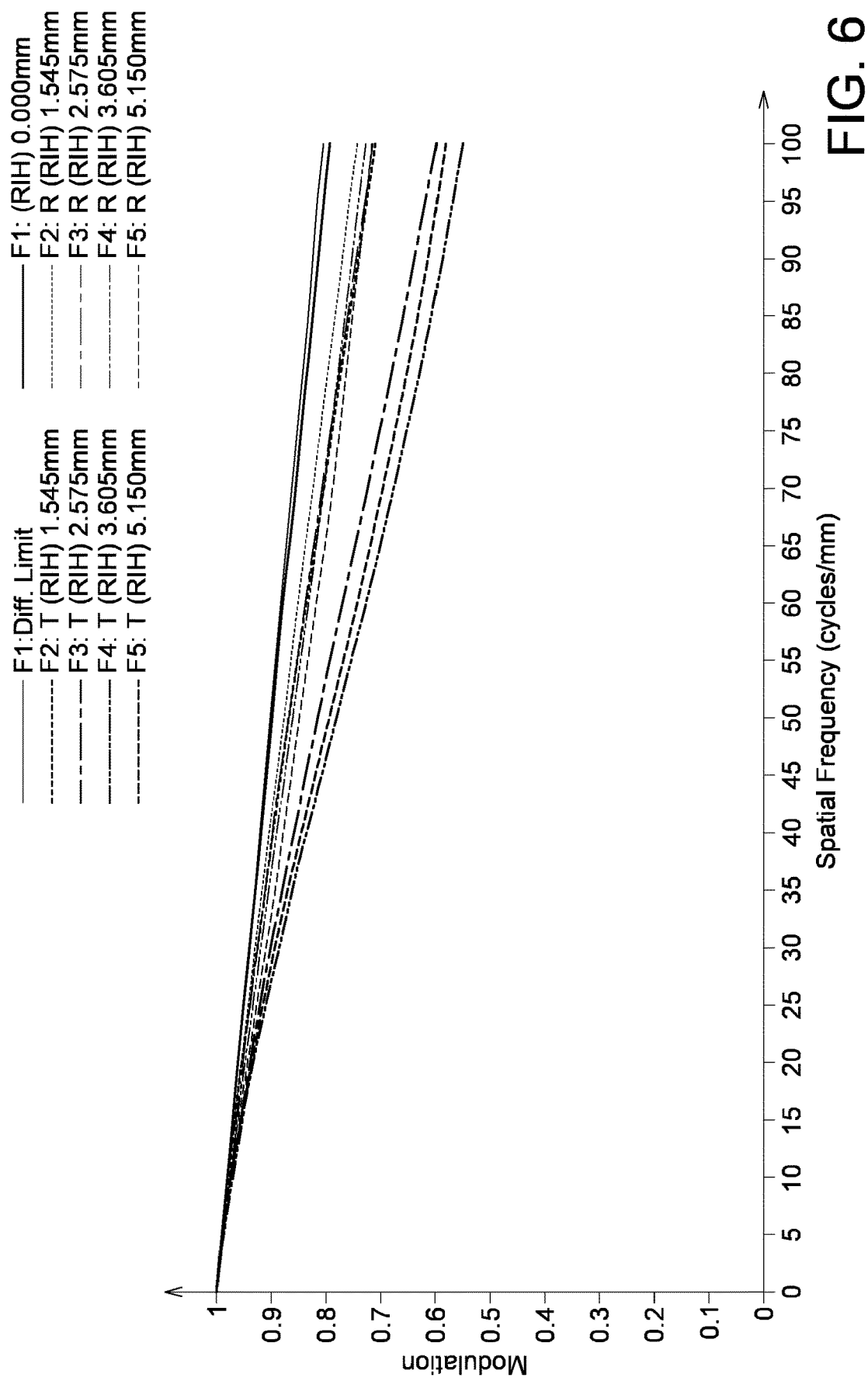

The lens assembly according to a second embodiment of the present invention is disclosed below. FIG. 4 is a schematic diagram of a lens assembly 10b according to the second embodiment of the present invention. The first lens L1, the second lens L2, the third lens L3, the fourth lens L4 and the fifth lens L5 together form a first lens group (such as a front group) 20 with a negative refractive power. The sixth lens L6, the seventh lens L7, the eighth lens L8 and the ninth lens L9 together form a second lens group (such as a rear group) 30 with a positive refractive power. In the present embodiment, the refractive powers of the first lens L1 to the ninth lens L9 of the lens assembly 10b sequentially are: negative, negative, positive, negative, positive, positive, negative, positive, positive, all lenses are glass lenses, and the second lens and the ninth lens are aspheric lenses. In the present embodiment, the aspheric lenses are formed by the glass molding method. In an embodiment, aspheric glass lenses can be replaced by aspheric plastics lenses. In the present embodiment, the fourth lens L4 and the fifth lens L5 form a combined lens, and the sixth lens L6 and the seventh lens L7 also form a combined lens, but the present invention is not limited thereto. In the present embodiment, the surface S1 has a diameter of 14.51 mm, and the surface S17 has a diameter of 9.69 mm. The design parameters of the lens and the peripheral elements of the lens assembly 10b are listed in Table 3.

TABLE 3

F/# = 2.8; TTL = 25 (mm); LT = 23 (mm)
EFL = 3.7 (mm); FOV = 138°; DL/LT = 0.421
D1/DL = 1.497; IMH = 5.15 (mm); EFL/LT = 0.161

| Surface | Radius of curvature (mm) | Interval (mm) | Refractive power | Abbe number | Element |
|---|---|---|---|---|---|
| S1 | 14.29 | 0.80 | 1.73 | 54.68 | L1 (convex-concave) |
| S2 | 5.19 | 2.18 | | | |
| S3* | 48.96 | 0.80 | 1.67 | 54.78 | L2 (aspheric) |
| S4* | 4.71 | 1.57 | | | |
| S5 | 9.55 | 1.33 | 2.00 | 29.134 | L3 (plano-convex) |
| S6 | INF. | 0.79 | | | |
| S7 | −7.56 | 1.50 | 1.52 | 64.142 | L4 (bi-concave) |
| S8 | 4.86 | 2.56 | 1.77 | 49.5984 | L5 (bi-convex) |
| S9 | −24.21 | 0.76 | | | |
| S10 | INF. | 0.10 | | | Aperture 14 |
| S11 | 13.58 | 1.90 | 1.60 | 65.4436 | L6 (bi-convex) |
| S12 | −3.26 | 0.50 | 1.72 | 29.5181 | L7 (convex-concave) |
| S13 | −17.24 | 0.28 | | | |
| S14 | 7.10 | 2.22 | 1.50 | 81.6084 | L8 (bi-convex) |
| S15 | −10.84 | 2.24 | | | |
| S16* | −47.90 | 3.48 | 1.80 | 40.73 | L9 (aspheric) |
| S17* | 715.83 | 0.10 | | | |
| S18 | INF. | 0.21 | 1.52 | 64.14 | Filter 16 |
| S19 | INF. | 0.37 | | | |
| S20 | INF. | 0.50 | 1.52 | 55 | Glass cover 18 |
| S21 | INF. | 0.83 | | | |
| S22 | | | | | Image plane 19 |

The aspheric coefficient and the conic coefficient of each order term of the aspheric lens surface according to the second embodiment of the present invention are listed in Table 4.

TABLE 4

| | S3* | S4* | S16* | S17* |
|---|---|---|---|---|
| k | 99 | 0.49 | 17.99 | −99 |
| A | 7.85E−03 | 8.00E−03 | −5.13E−03 | −2.91E−03 |
| B | −8.98E−04 | −9.37E−04 | 4.74E−04 | 4.64E−04 |
| C | 8.07E−05 | 4.77E−05 | −2.19E−04 | −7.32E−05 |
| D | −5.68E−06 | 1.66E−06 | 4.97E−05 | 6.30E−06 |
| E | 2.79E−07 | −1.31E−06 | −7.36E−06 | −3.34E−07 |
| F | −8.36E−09 | 2.29E−07 | 6.93E−07 | 1.02E−08 |
| G | 9.87E−11 | −2.18E−08 | −3.97E−08 | −1.31E−10 |
| H | 1.57E−12 | 1.11E−09 | 1.27E−09 | −8.64E−13 |
| I | −4.54E−14 | −2.35E−11 | −1.68E−11 | 3.07E−14 |

The interval of the surface S1 is the distance from the surface S1 to the surface S2 on the optical axis 12. The interval of the surface S2 is the distance on the optical axis 12 from the surface S2 to the surface S3. The interval of the surface S21 is the distance on the optical axis 12 from the surface S21 to the image plane 19 of a visible light at an effective focal length. The lens assembly includes at least three lenses whose Abbe numbers are greater than 60. The rear group includes at least two lenses whose Abbe numbers are greater than 60.

Figure 7:
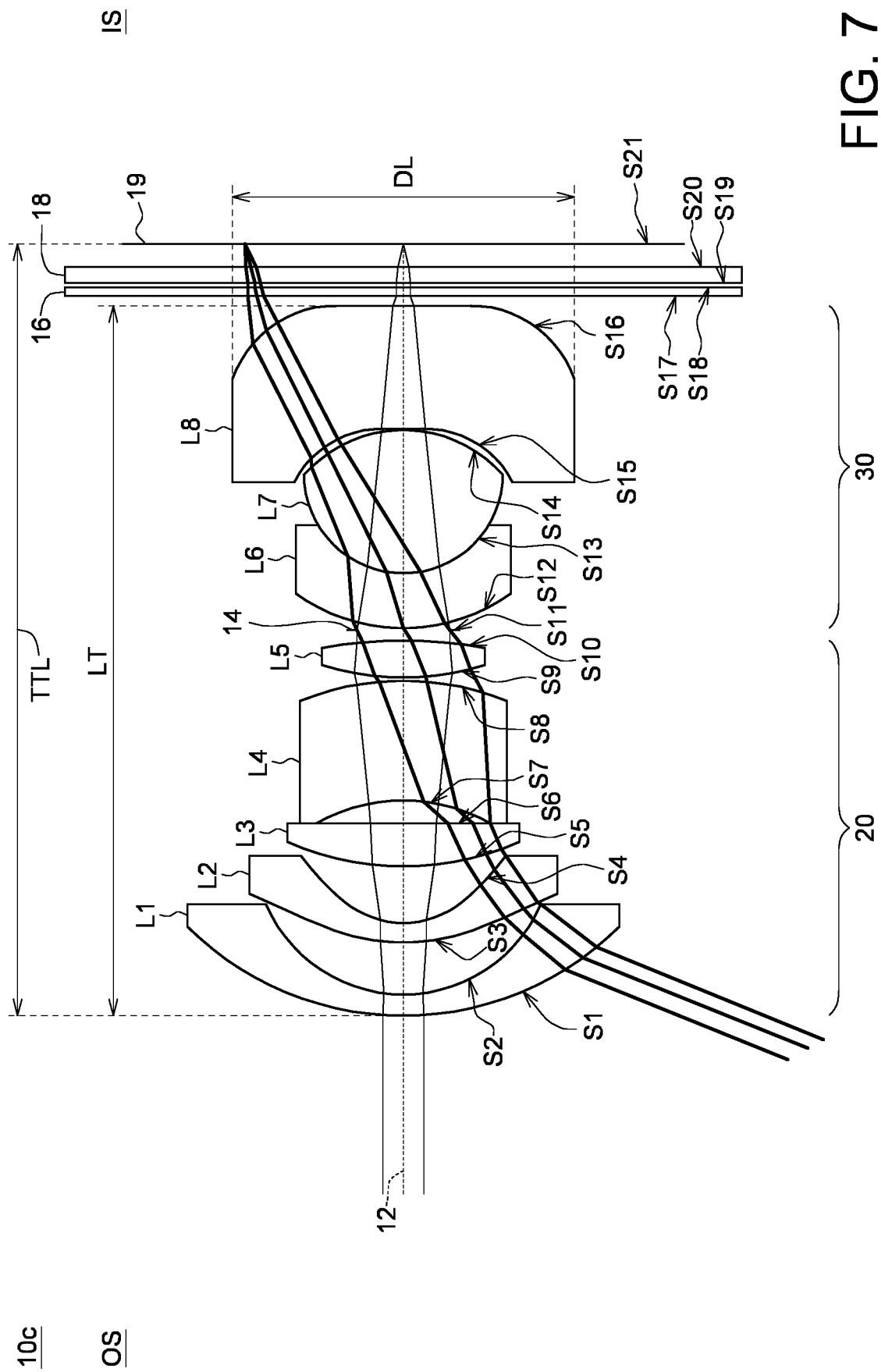
FIG. 7 is a schematic diagram of a lens assembly 10c according to an embodiment of the present invention.
Figure 8:
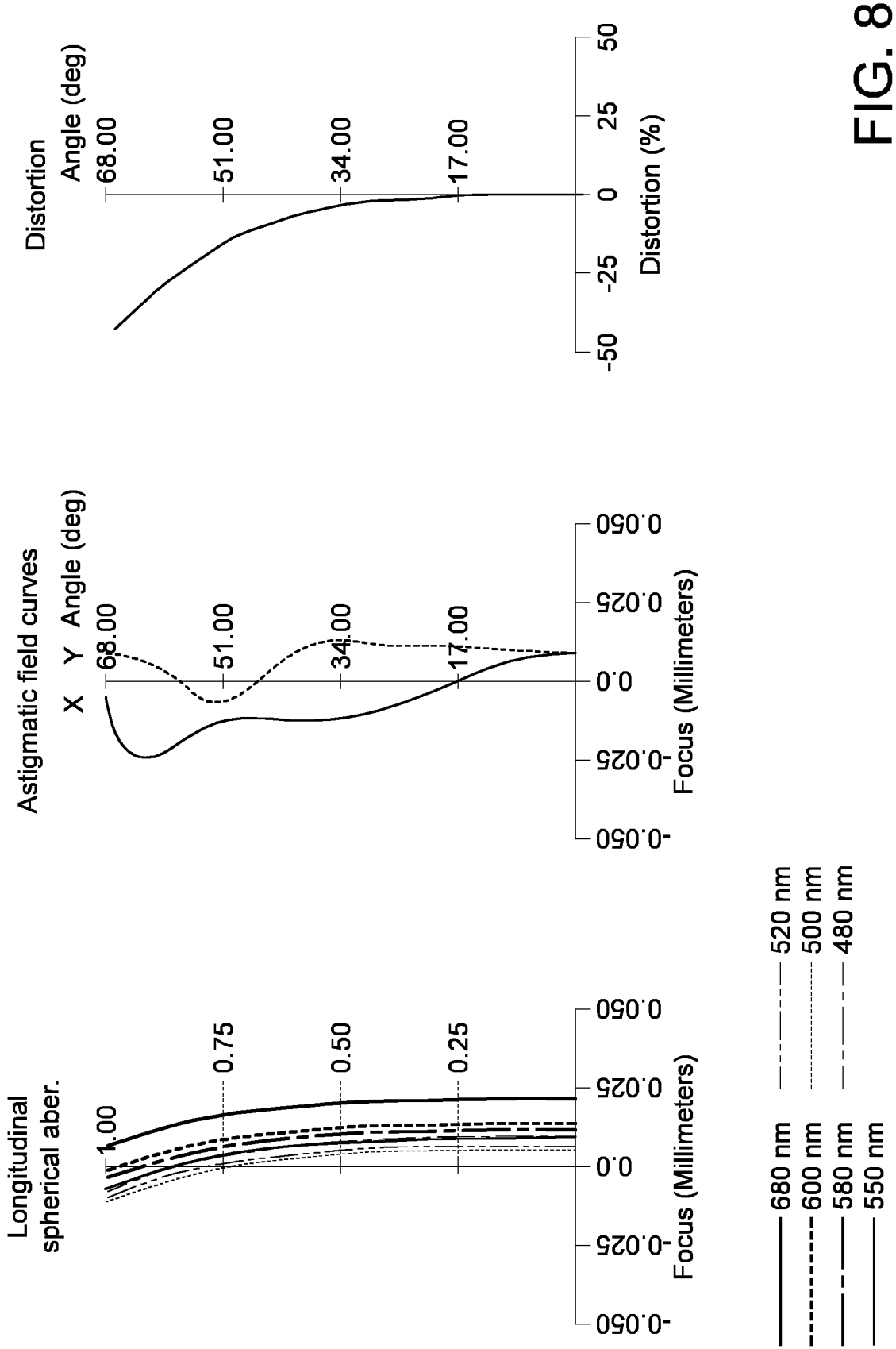
FIGS. 8~9 respectively are graphs of spherical aberration, astigmatic field and optical distortion of the lens assembly 10c and a characteristic graph of spectrum modulation conversion of a visible light.
Figure 9:
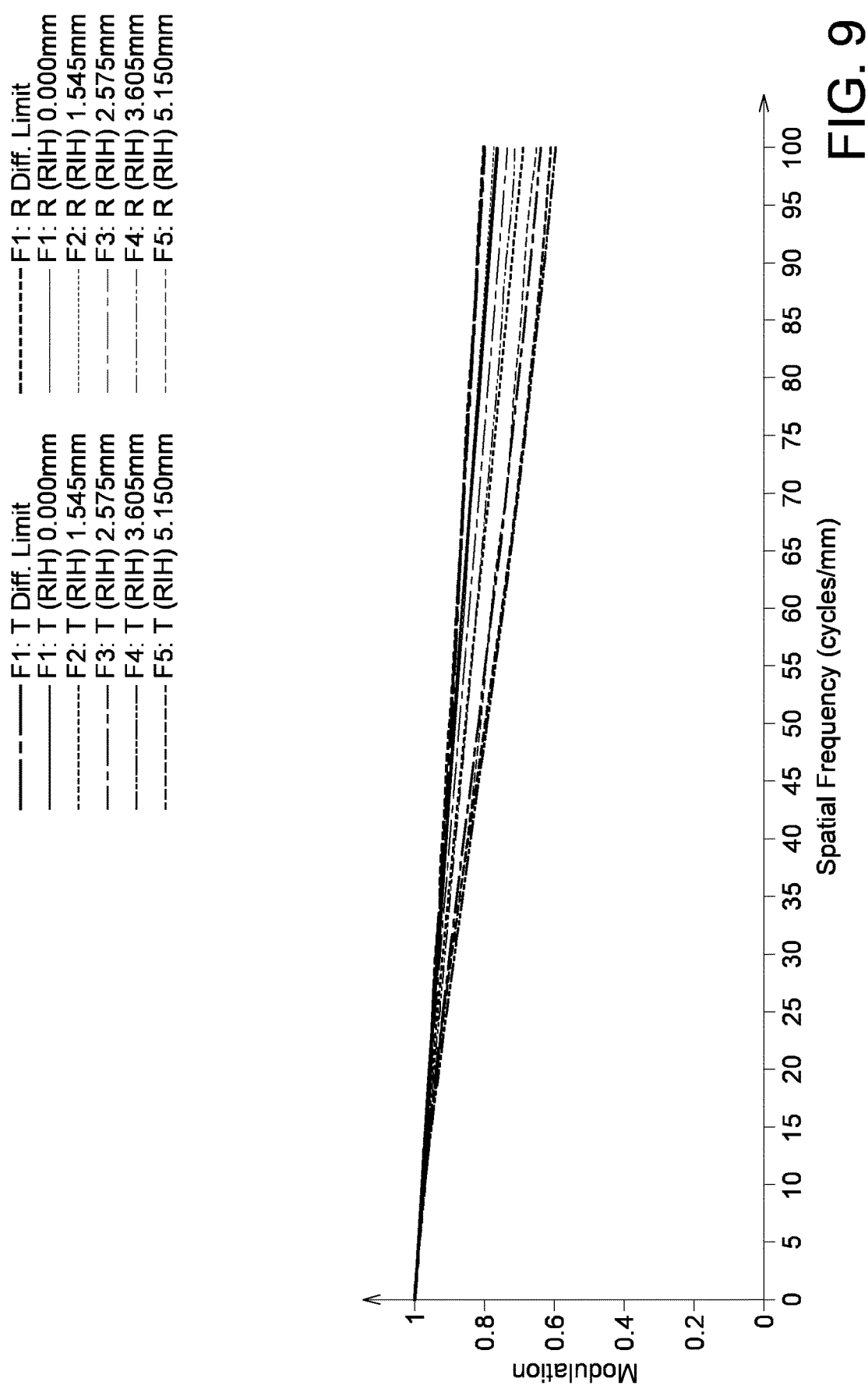
Figure 10A:
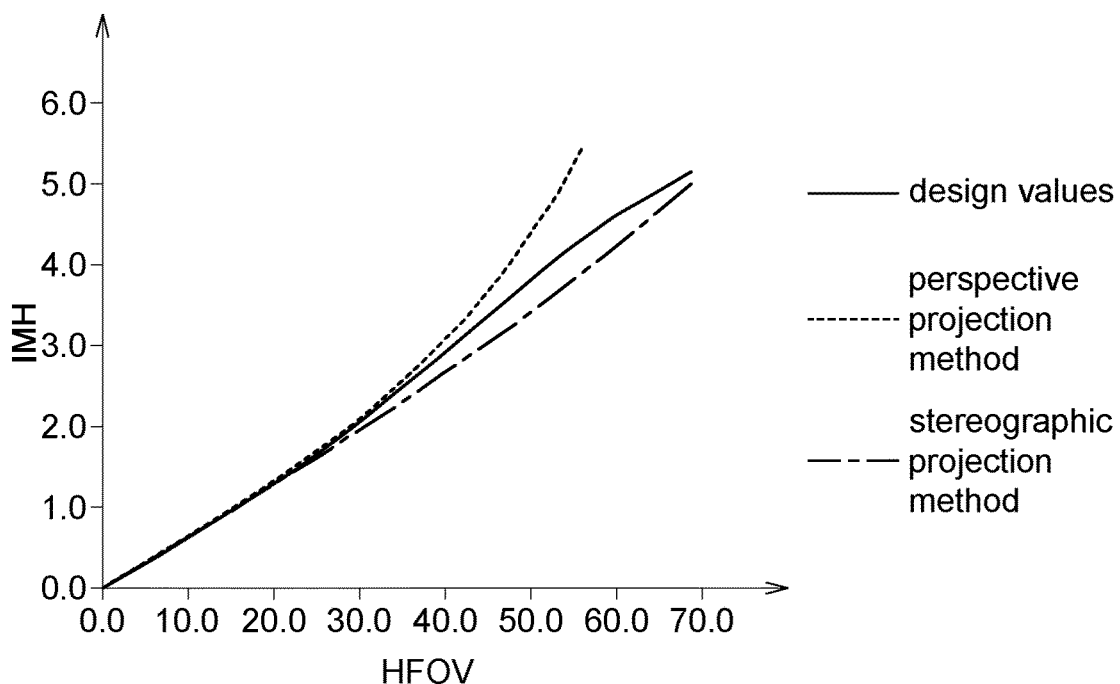
FIGS. 10a~10f respectively are comparison graphs of the results obtained using the design values of the lens assembly 10a, 10b, 10c, 10d, 10e, and 10f vs the results obtained using different projection methods.
Figure 10B:
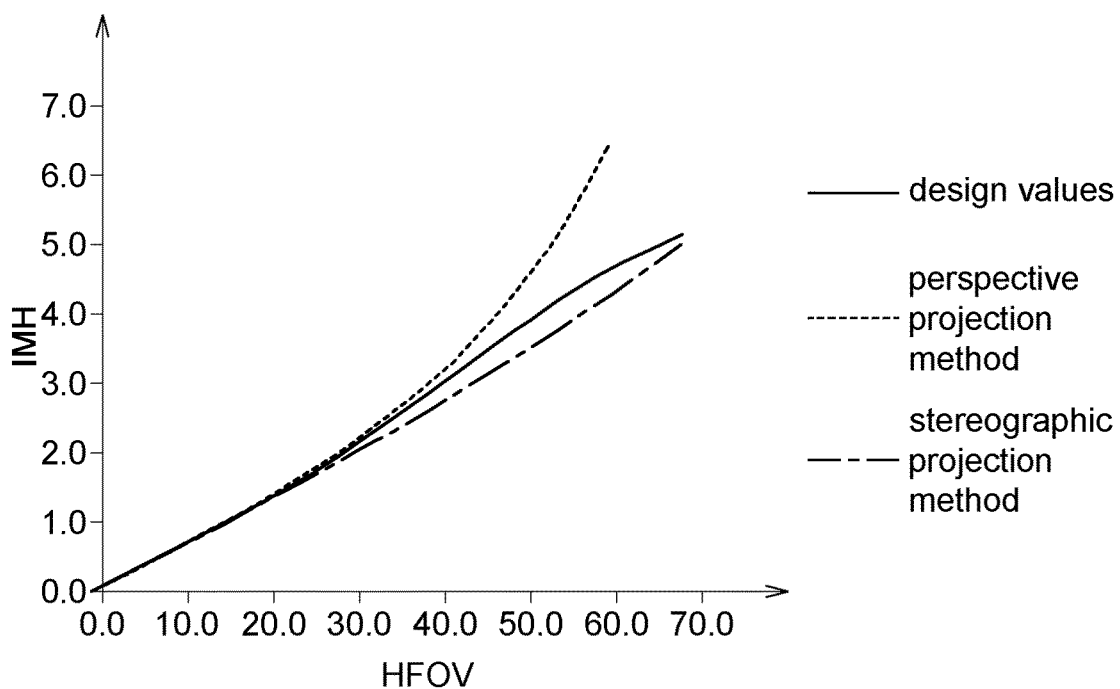
Figure 10C:
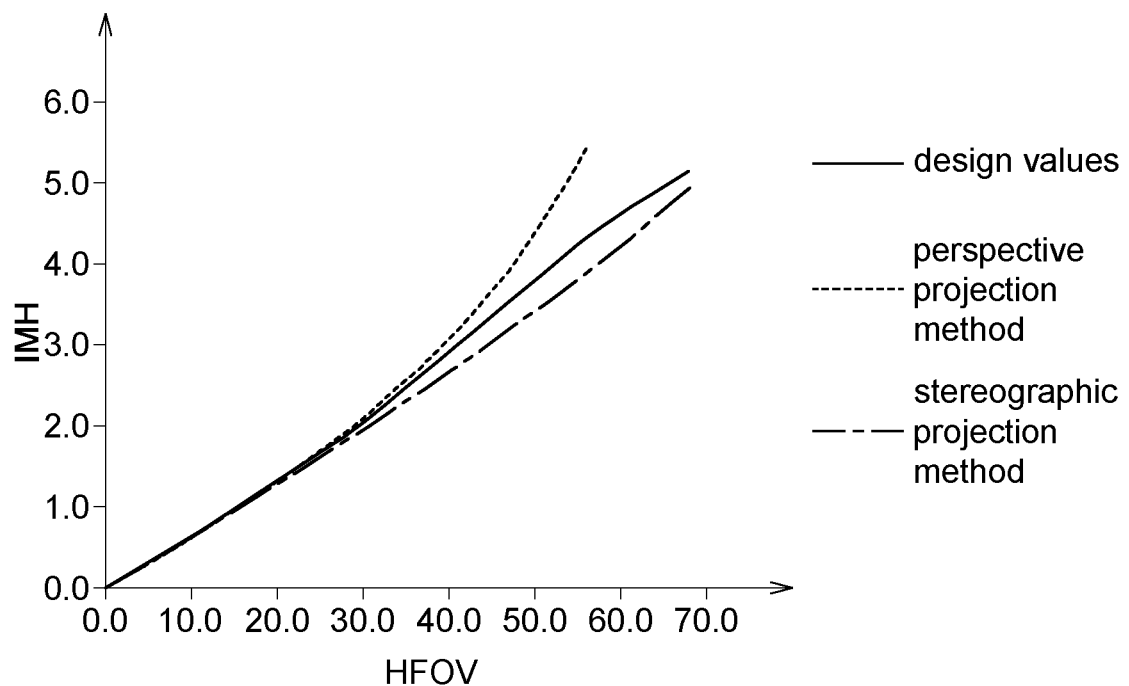
Figure 10D:
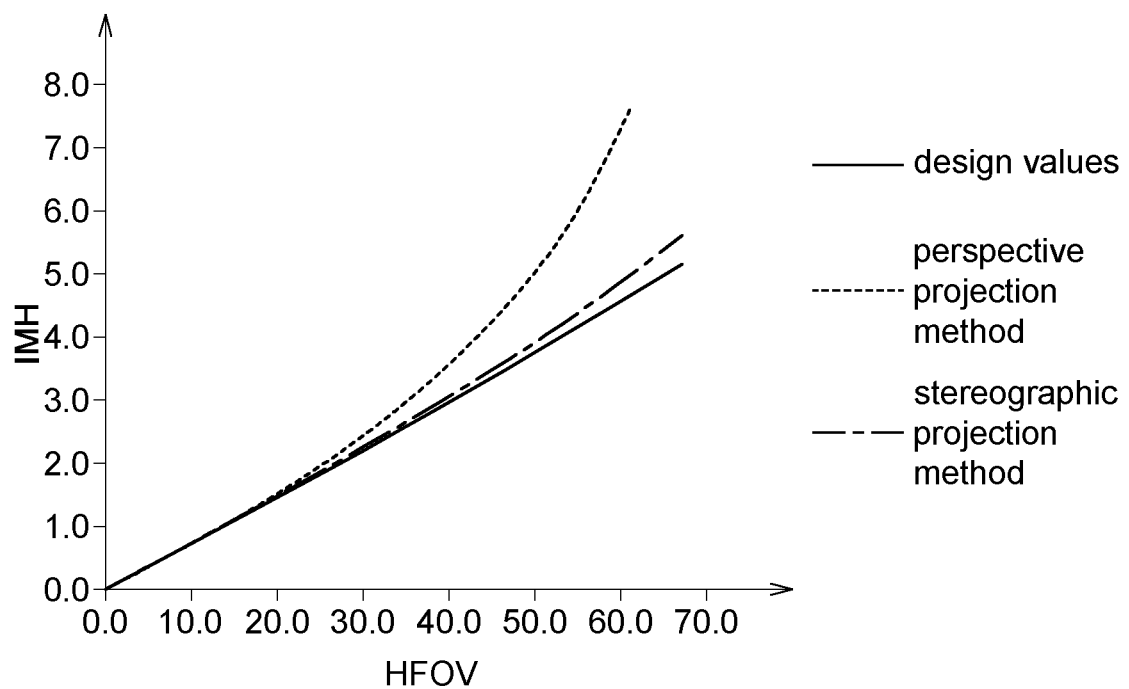
Figure 10E:
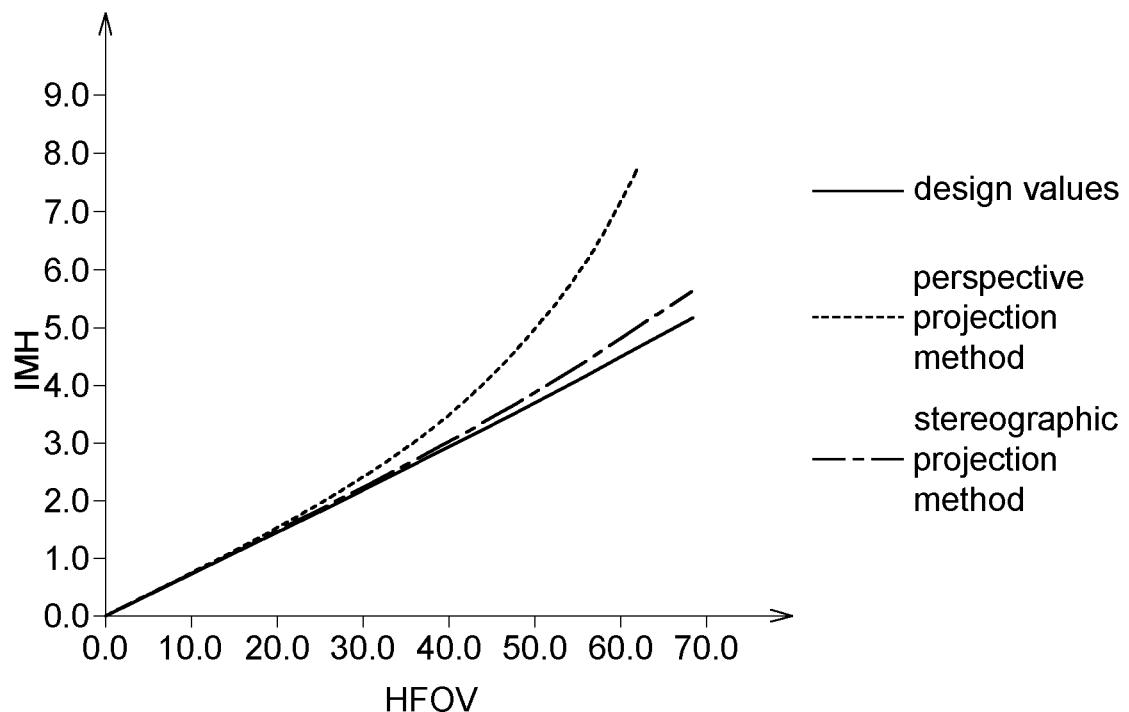
Figure 10F:
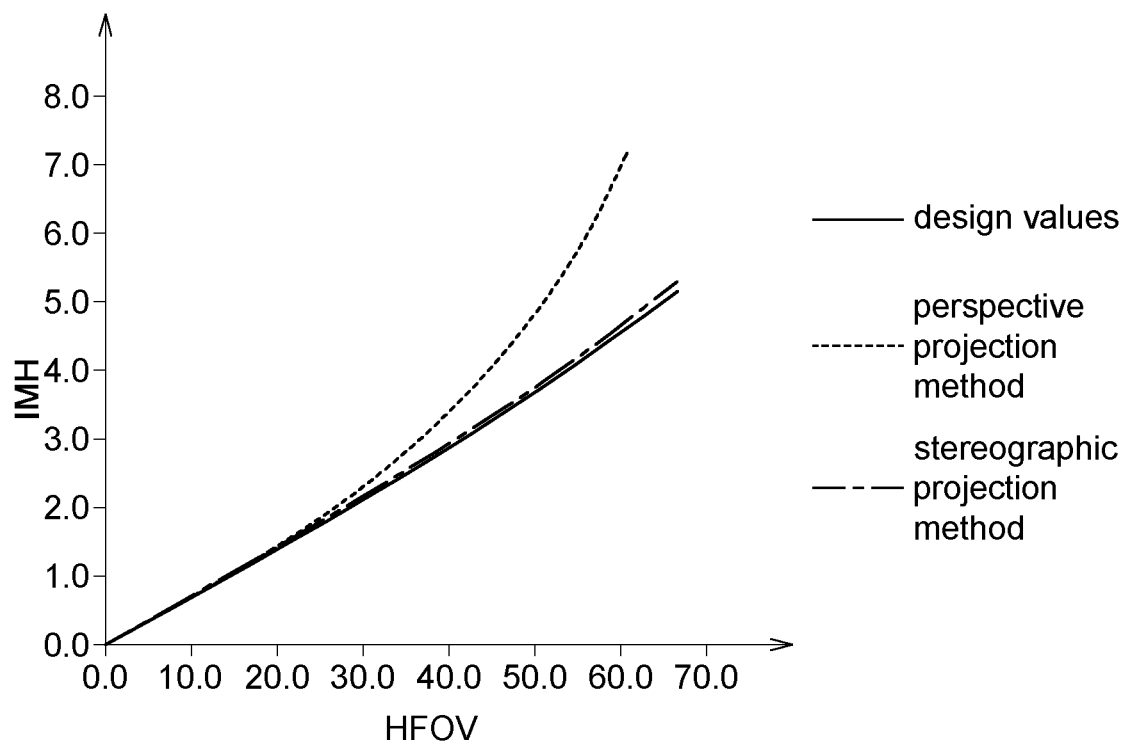

The lens assembly according to a third embodiment of the present invention is disclosed below. FIG. 7 is a schematic diagram of a lens assembly 10c according to the third embodiment of the present invention. The first lens L1, the second lens L2, the third lens L3, the fourth lens L4 and the fifth lens L5 together form a first lens group (such as a front group) 20 with a positive refractive power. The sixth lens L6, the seventh lens L7 and the eighth lens L8 together form a second lens group (such as a rear group) 30 with a positive refractive power. In the present embodiment, the refractive powers of the first lens L1 to the eighth lens L8 sequentially are: negative, negative, positive, negative, positive, negative, positive, negative, all lenses are glass lenses, but the second lens and the eighth lens are aspheric lenses. In the present embodiment, the aspheric lenses are formed by the glass molding method. In an embodiment, aspheric glass lenses can be replaced by aspheric plastics lenses. In the present embodiment, the sixth lens L6 and the seventh lens L7 form a combined lens, but the present invention is not limited thereto. In the present embodiment, the surface S1 has a diameter of 12.53 mm, and the surface S16 has a diameter of 9.79 mm. The design parameters of the lens and the peripheral elements of the lens assembly 10c are listed in Table 5.

TABLE 5

F/# = 2.8; TTL = 25 (mm); LT = 23 (mm)
EFL = 3.66 (mm); FOV = 136°; DL/LT = 0.544
D1/DL = 1.279; IMH = 5.15 (mm); EFL/LT = 0.159

| Surface | Radius of curvature (mm) | Interval (mm) | Refractive power | Abbe number | Element |
|---|---|---|---|---|---|
| S1 | 10.00 | 0.65 | 1.88 | 40.77 | L1 (convex-concave) |
| S2 | 4.79 | 1.72 | | | |
| S3* | 7.03 | 0.61 | 1.59 | 61.05 | L2 (aspheric) |
| S4* | 2.71 | 1.86 | | | |
| S5 | 9.45 | 1.35 | 2.00 | 25.46 | L3 (concave-convex) |
| S6 | 452.33 | 0.73 | | | |
| S7 | −6.43 | 3.97 | 1.88 | 40.77 | L4 (convex-concave) |
| S8 | −8.61 | 0.05 | | | |
| S9 | 8.80 | 1.19 | 1.50 | 81.55 | L5 (bi-convex) |
| S10 | −16.54 | 0.38 | | | |
| S11 | INF. | 0.06 | | | aperture 14 |
| S12 | 6.06 | 1.76 | 2.00 | 19.32 | L6 (convex-concave) |
| S13 | 3.21 | 4.64 | 1.50 | 81.55 | L7 (bi-convex) |
| S14 | −4.18 | 0.05 | | | |
| S15* | −11.64 | 3.98 | 1.80 | 40.73 | L8 (aspheric) |
| S16* | 410.40 | 0.40 | | | |
| S17 | INF. | 0.21 | 1.52 | 64.17 | Filter 16 |
| S18 | INF. | 0.07 | | | |
| S19 | INF. | 0.50 | 1.52 | 54.49 | Glass cover 18 |
| S20 | INF. | 0.83 | | | |
| S21 | | | | | Image plane 19 |

The aspheric coefficient and the conic coefficient of each order term of the aspheric lens surface according to the third embodiment of the present invention are listed in Table 6.

TABLE 6

| | S3* | S4* | S15* | S16* |
|---|---|---|---|---|
| k | −0.86 | −0.46 | 0 | 0 |
| A | 1.92E−03 | 5.36E−04 | −4.88E−03 | −1.20E−03 |
| B | −3.35E−04 | −5.03E−04 | −2.08E−04 | −7.41E−05 |
| C | 2.37E−05 | −1.06E−05 | 1.17E−05 | 1.93E−06 |
| D | −9.27E−07 | 3.22E−06 | −1.09E−06 | −3.03E−08 |
| E | 1.48E−08 | −2.34E−07 | 0 | 0 |

The interval of the surface S1 is the distance on the optical axis 12 from the surface S1 to the surface S2. The interval of the surface S2 is the distance on the optical axis 12 from the surface S2 to the surface S3. The interval of the surface S20 is the distance on the optical axis 12 from the surface S20 to the image plane 19 of a visible light at an effective focal length. The front group includes at least two lenses whose Abbe numbers are greater than 60.

Figure 11:
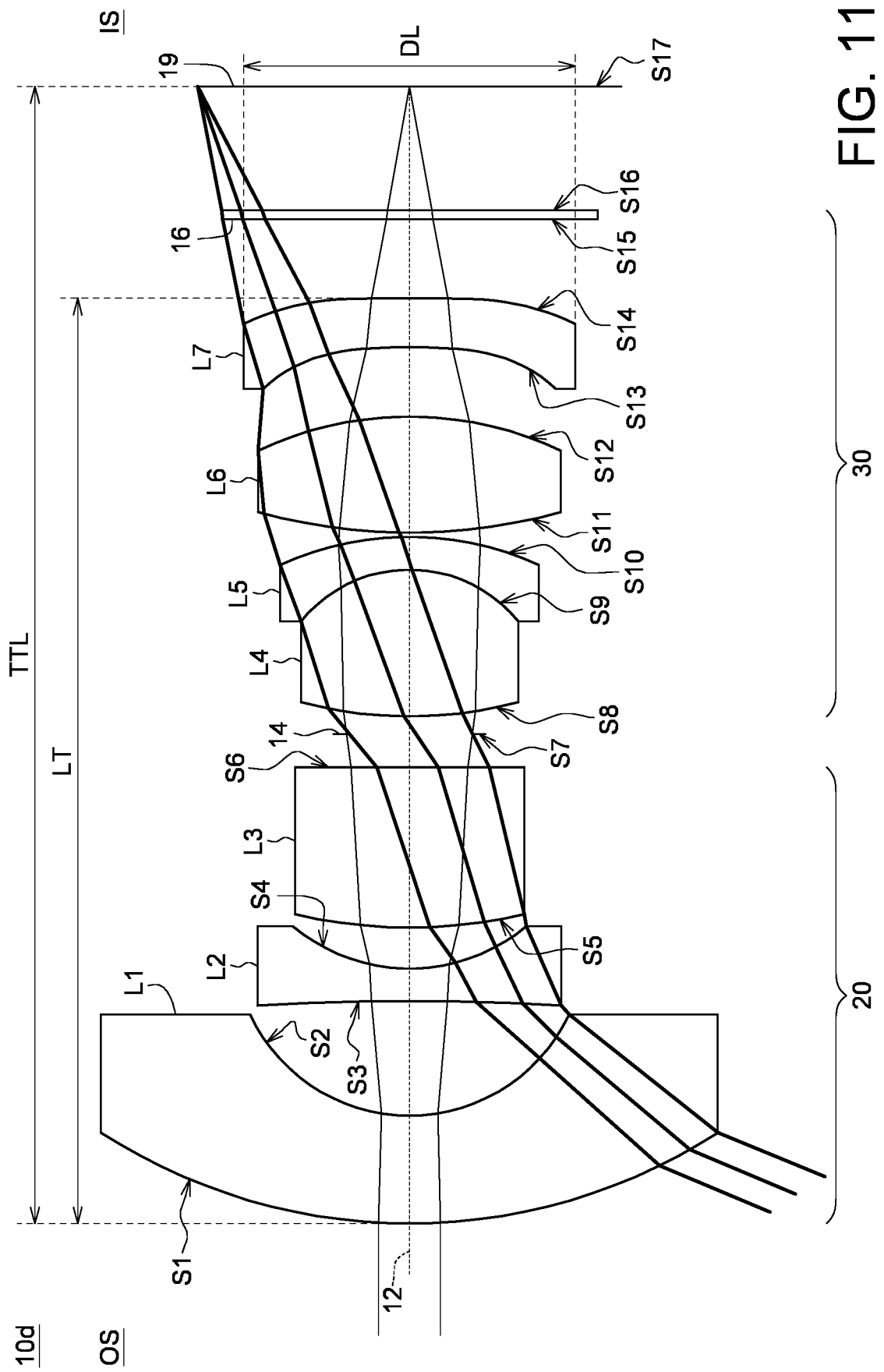
FIG. 11 is a schematic diagram of a lens assembly 10d according to an embodiment of the present invention.
Figure 12:
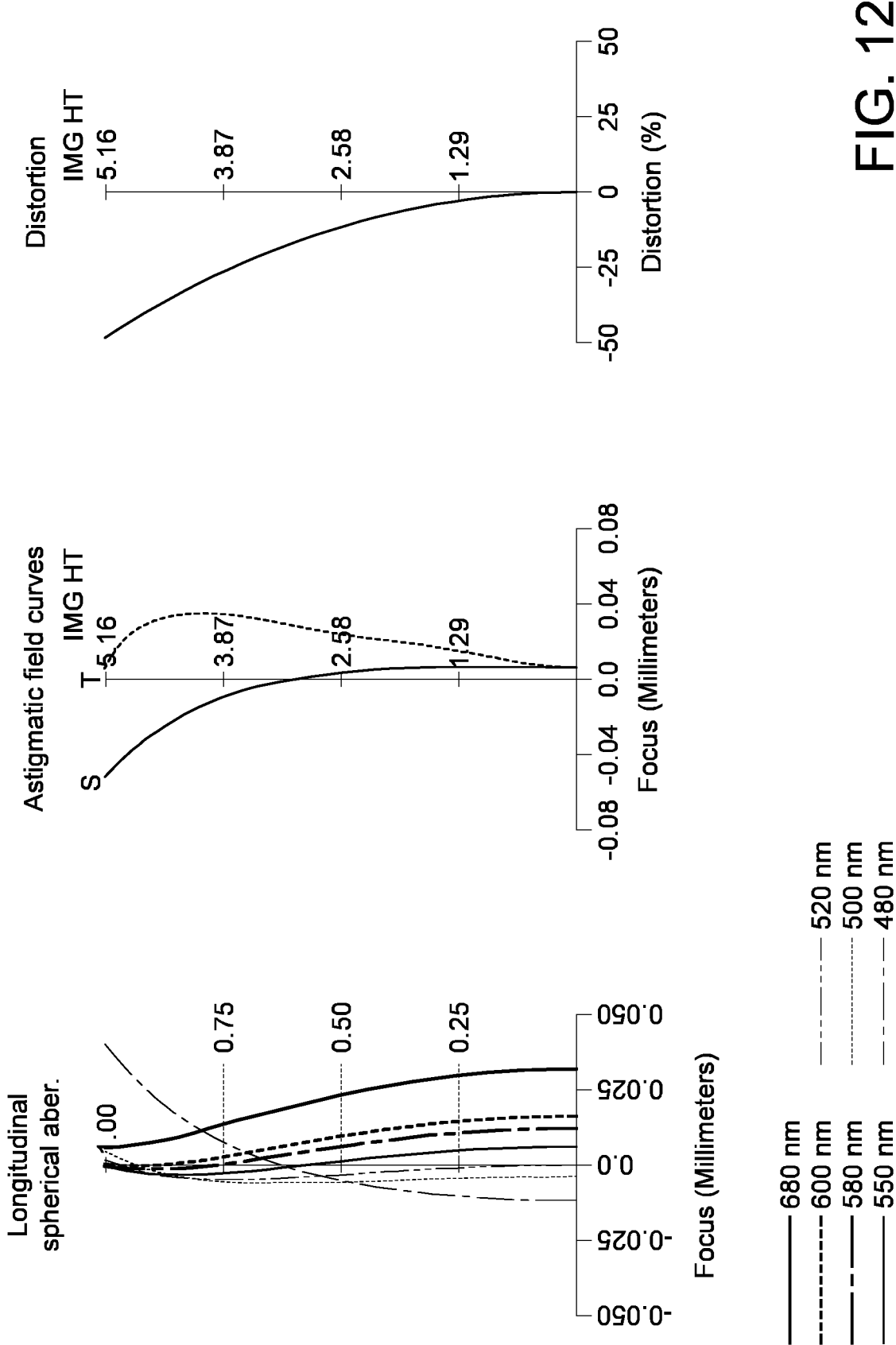
FIGS. 12~13 respectively are graphs of spherical aberration, astigmatic field and optical distortion of the lens assembly 10d and a characteristic graph of spectrum modulation conversion of a visible light.
Figure 13:
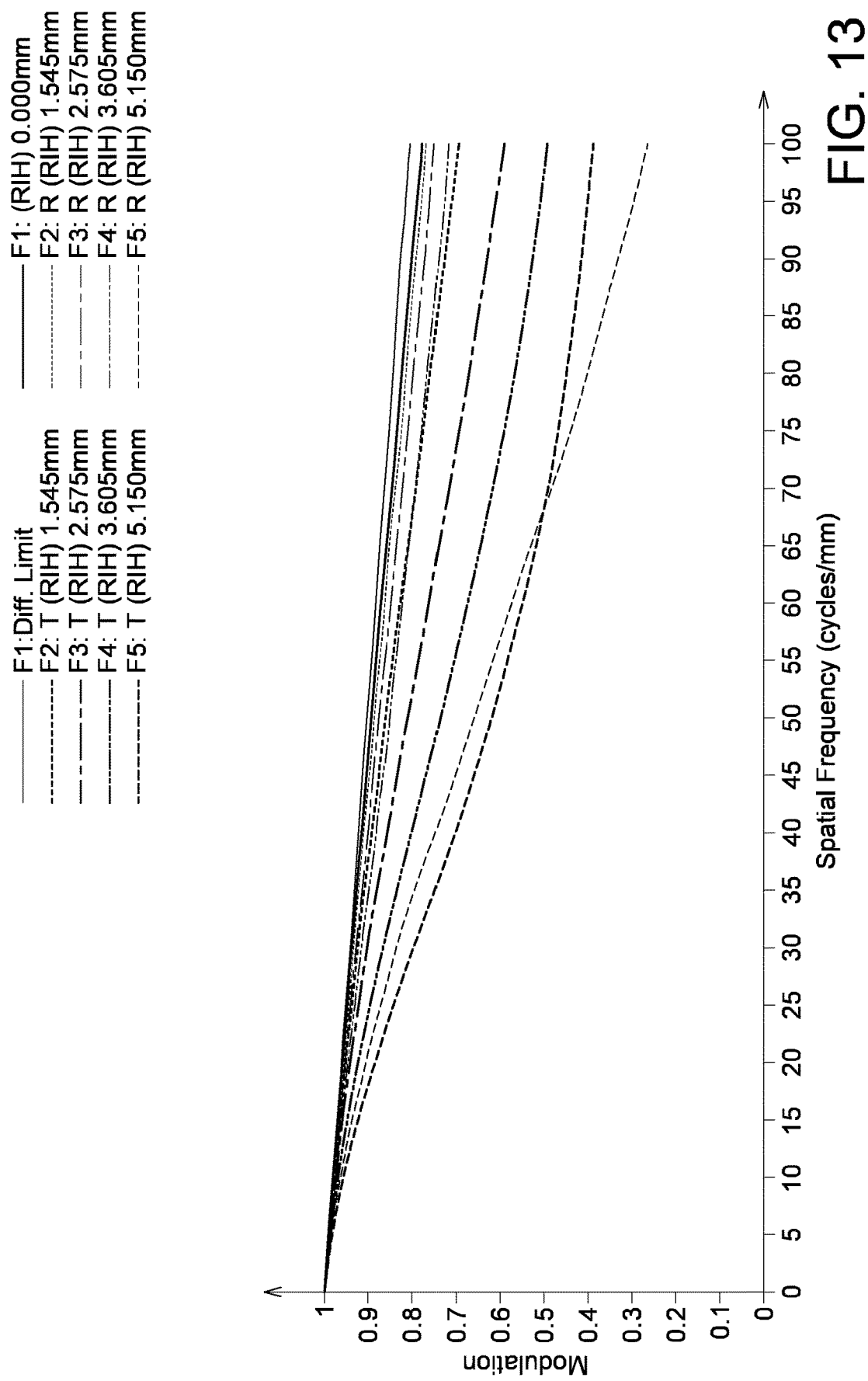

The lens assembly according to a fourth embodiment of the present invention is disclosed below. FIG. 11 is a schematic diagram of a lens assembly 10d according to the fourth embodiment of the present invention. The first lens L1, the second lens L2 and the third lens L3 together form a first lens group (such as a front group) 20 with a negative refractive power. the fourth lens L4, the fifth lens L5, the sixth lens L6 and the seventh lens L7 together form a second lens group (such as a rear group) 30 with a positive refractive power. In the present embodiment, the refractive powers of the first lens L1 to the seventh lens L7 of the lens assembly 10d sequentially are: negative, negative, positive, positive, negative, positive, negative, all lenses are glass lenses, and the seventh lens is an aspheric lens, In the present embodiment, the aspheric lenses are formed by the glass molding method, and the filter 16 is disposed between the second lens group 30 and the image plane 19. In an embodiment, aspheric glass lenses can be replaced by aspheric plastics lenses. In the present embodiment, the fourth lens L4 and the fifth lens L5 form a combined lens, but the present invention is not limited thereto. In the present embodiment, the surface S1 has a diameter of 15.0 mm, the surface S14 has a diameter of 8.07 mm. The design parameters of the lens and the peripheral elements of the lens assembly 10d are listed in Table 7.

TABLE 7

F/# = 2.8; TTL = 27.8 (mm); LT = 22.62 (mm)
EFL = 4.22 (mm); FOV = 134度; DL/LT = 0.357
D1/DL = 1.859; IMH = 5.15 (mm); EFL/LT = 0.187

| Surface | Radius of curvature (mm) | Interval (mm) | Refractive power | Abbe number | Element |
|---|---|---|---|---|---|
| S1 | 13.85 | 2.63 | 1.76 | 52.33 | L1 (convex-concave) |
| S2 | 4.28 | 2.79 | | | |
| S3 | −59.56 | 0.80 | 1.55 | 75.5 | L2 (bi-concave) |
| S4 | 4.44 | 1.00 | | | |
| S5 | 12.19 | 3.92 | 2.00 | 25.458 | L3 (concave-convex) |
| S6 | 164.62 | 0.81 | | | |
| S7 | INF. | 0.44 | | | Aperture 14 |
| S8 | 10.36 | 3.60 | 1.60 | 65.46 | L4 (bi-convex) |
| S9 | −3.39 | 0.79 | 1.72 | 29.51 | L5 (convex-concave) |
| S10 | −7.57 | 0.10 | | | |
| S11 | 13.58 | 2.85 | 1.50 | 81.61 | L6 (bi-convex) |
| S12 | −8.63 | 1.70 | | | |
| S13* | −20.17 | 1.20 | 1.68 | 31.3 | L7 (aspheric) |
| S14* | −400.00 | 1.95 | | | |
| S15 | INF. | 0.21 | 1.52 | 64.17 | Filter 16 |
| S16 | INF. | 3.02 | | | |
| S17 | | | | | Image plane 19 |

The aspheric coefficient and the conic coefficient of each order term of the aspheric lens surface according to the fourth embodiment of the present invention are listed in Table 8.

TABLE 8

| | S13* | S14* |
|---|---|---|
| k | 12.438 | 27.743 |
| A | −4.45E−03 | −3.50E−03 |
| B | 4.00E−05 | 8.40E−05 |
| C | −6.21E−06 | −2.19E−06 |
| D | 6.72E−07 | 1.67E−07 |
| E | −2.04E−08 | −4.40E−09 |

The interval of the surface S1 is the distance from the surface S1 to the surface S2 on the optical axis 12. The interval of the surface S2 is the distance on the optical axis 12 from the surface S2 to the surface S3. The interval of the surface S16 is the distance on the optical axis 12 from the surface S16 to the image plane 19 of a visible light at an effective focal length. The lens assembly includes at least three lenses whose Abbe numbers are greater than 60. The rear group includes at least two lenses whose Abbe numbers are greater than 60.

Figure 14:
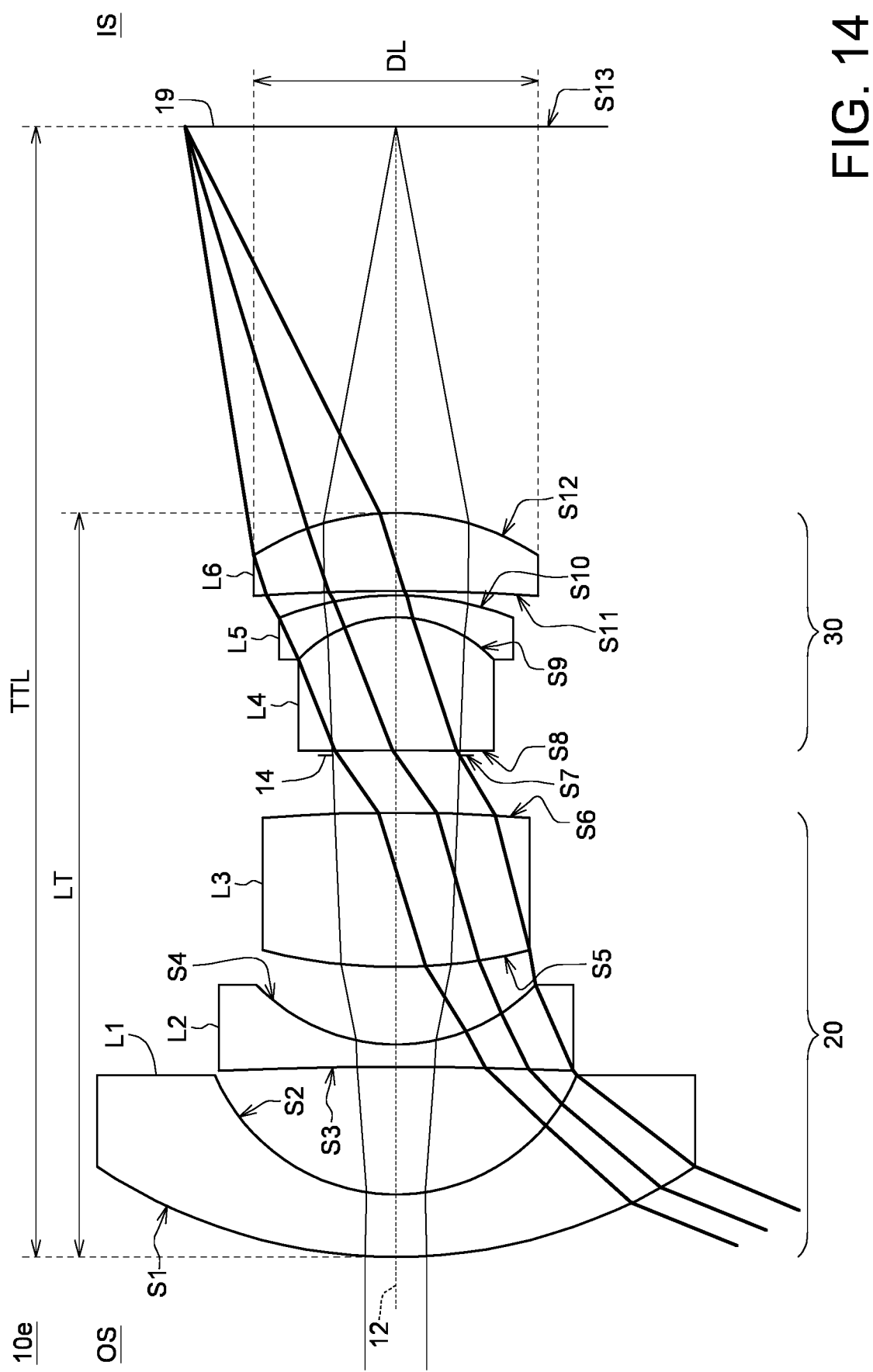
FIG. 14 is a schematic diagram of a lens assembly 10e according to an embodiment of the present invention.
Figure 15:
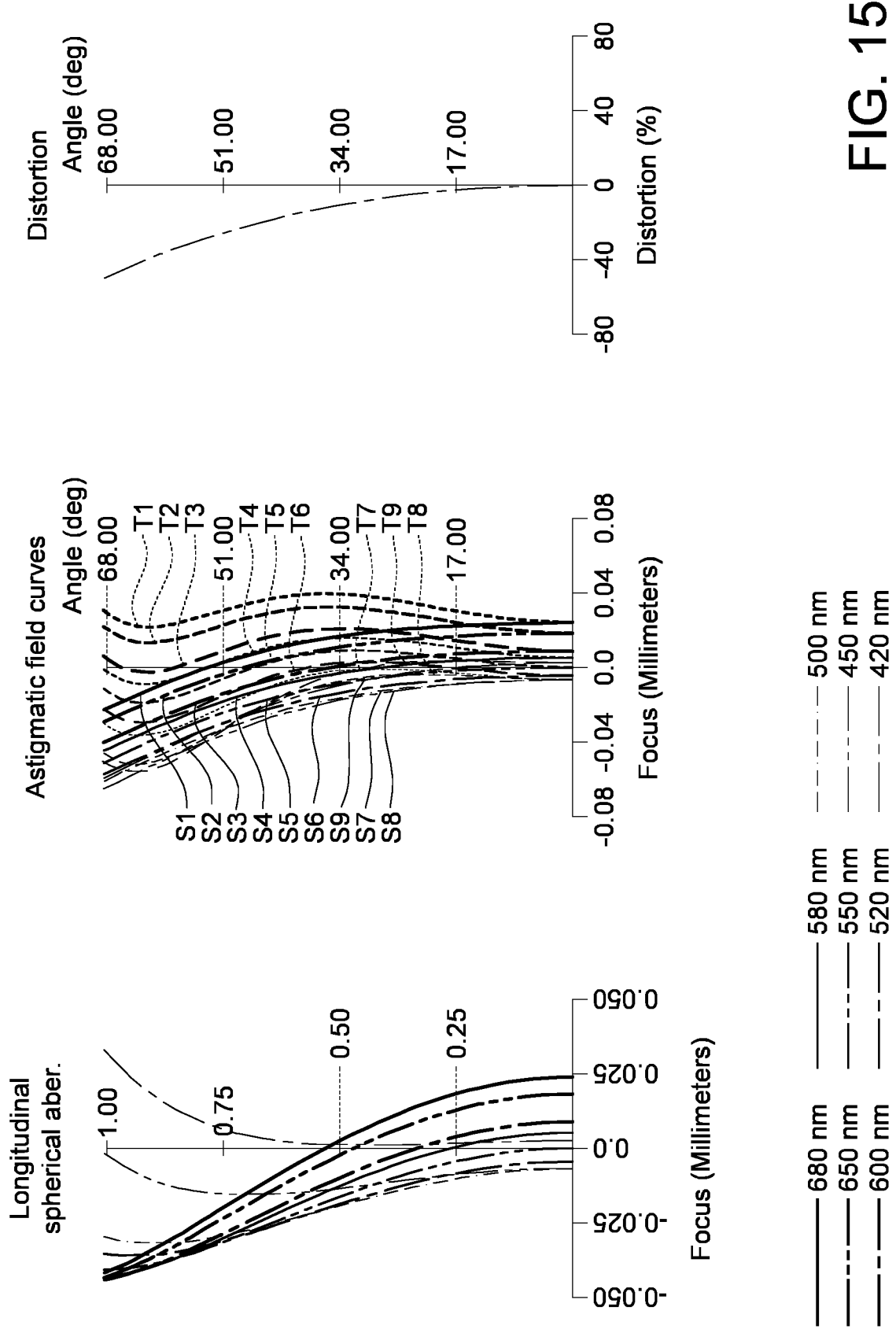
FIGS. 15~16 respectively are graphs of spherical aberration, astigmatic field and optical distortion of the lens assembly 10e and a characteristic graph of spectrum modulation conversion of a visible light.
Figure 16:
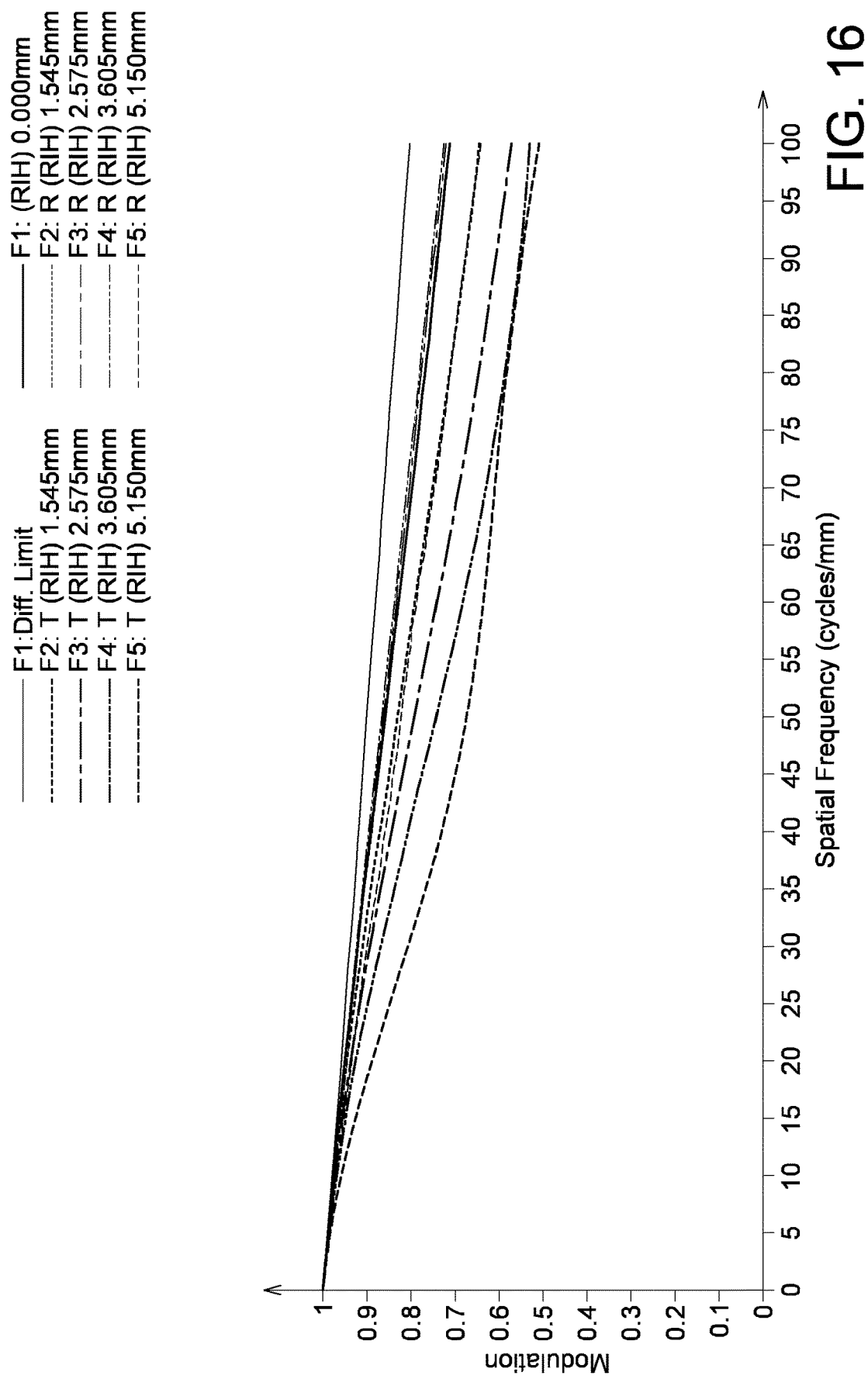

The lens assembly according to a fifth embodiment of the present invention is disclosed below. FIG. 14 is a schematic diagram of a lens assembly 10e according to the fifth embodiment of the present invention. The first lens L1, the second lens L2 and the third lens L3 together form a first lens group (such as a front group) 20 with a negative refractive power. the fourth lens L4, the fifth lens L5 and the sixth lens L6 together form a second lens group (such as a rear group) 30 with a positive refractive power. In the present embodiment, the refractive powers of the first lens L1 to the sixth lens L6 of the lens assembly 10e sequentially are: negative, negative, positive, positive, negative, positive, all lenses are glass lenses, and the sixth lens is an aspheric lens, In the present embodiment, the aspheric lenses are formed by the glass molding method, and there are no filters or glass covers between the second lens group 30 and the image plane 19. In an embodiment, aspheric glass lenses can be replaced by aspheric plastics lenses. In the present embodiment, the fourth lens L4 and the fifth lens L5 form a combined lens, but the present invention is not limited thereto. In the present embodiment, the surface S1 has a diameter of 14.6 mm, the surface S12 has a diameter of 6.95 mm. The design parameters of the lens and the peripheral elements of the lens assembly 10e are listed in Table 9.

TABLE 9

F/# = 2.8; TTL = 27.8 (mm); LT = 18.3 (mm)
EFL = 4.17 (mm); FOV = 136度; DL/LT = 0.38
D1/DL = 2.1; IMH = 5.15 (mm); EFL/LT = 0.228

| Surface | Radius of curvature (mm) | Interval (mm) | Refractive power | Abbe number | Element |
|---|---|---|---|---|---|
| S1 | 13.19 | 1.55 | 1.80 | 46.5 | L1 (convex-concave) |
| S2 | 4.80 | 3.12 | | | |
| S3 | −95.18 | 0.55 | 1.50 | 81.61 | L2 (bi-concave) |
| S4 | 4.68 | 1.90 | | | |
| S5 | 12.69 | 3.80 | 2.00 | 25.458 | L3 (bi-convex) |
| S6 | −43.85 | 1.41 | | | |
| S7 | INF. | 0.13 | | | Aperture 14 |
| S8 | −77.23 | 3.26 | 1.59 | 68.62 | L4 (concave-convex) |
| S9 | −3.27 | 0.55 | 1.85 | 23.78 | L5 (convex-concave) |

TABLE 9-continued

F/# = 2.8; TTL = 27.8 (mm); LT = 18.3 (mm)
EFL = 4.17 (mm); FOV = 136度; DL/LT = 0.38
D1/DL = 2.1; IMH = 5.15 (mm); EFL/LT = 0.228

| Surface | Radius of curvature (mm) | Interval (mm) | Refractive power | Abbe number | Element |
|---|---|---|---|---|---|
| S10 | −7.62 | 0.10 | | | |
| S11* | −59.11 | 1.93 | 1.67 | 54.78 | L6 (aspheric) |
| S12* | −5.99 | 9.50 | | | |
| S13 | | | | | Image plane 19 |

TABLE 10

| | S11* | S12* |
|---|---|---|
| k | 0 | 0 |
| A | −3.9E−0.4 | 3.33E−0.4 |
| B | 2.37E−06 | 1.91E−06 |
| C | 1.59E−06 | 4.37E−07 |
| D | −1.10E−08 | 6.21E−08 |
| E | 0.00E+00 | 0.00E+00 |
| F | 0.00E+00 | 0.00E+00 |
| G | 0.00E+00 | 0.00E+00 |
| H | 0.00E+00 | 0.00E+00 |
| I | 0.00E+00 | 0.00E+00 |

The interval of the surface S1 is the distance from the surface S1 to the surface S2 on the optical axis 12. The interval of the surface S2 is the distance on the optical axis 12 from the surface S2 to the surface S3. The interval of the surface S12 is the distance on the optical axis 12 from the surface S12 to the image plane 19 of a visible light at an effective focal length. The lens assembly includes at least three lenses whose Abbe numbers are greater than 60. The rear group includes at least two lenses whose Abbe numbers are greater than 60.

Figure 17:
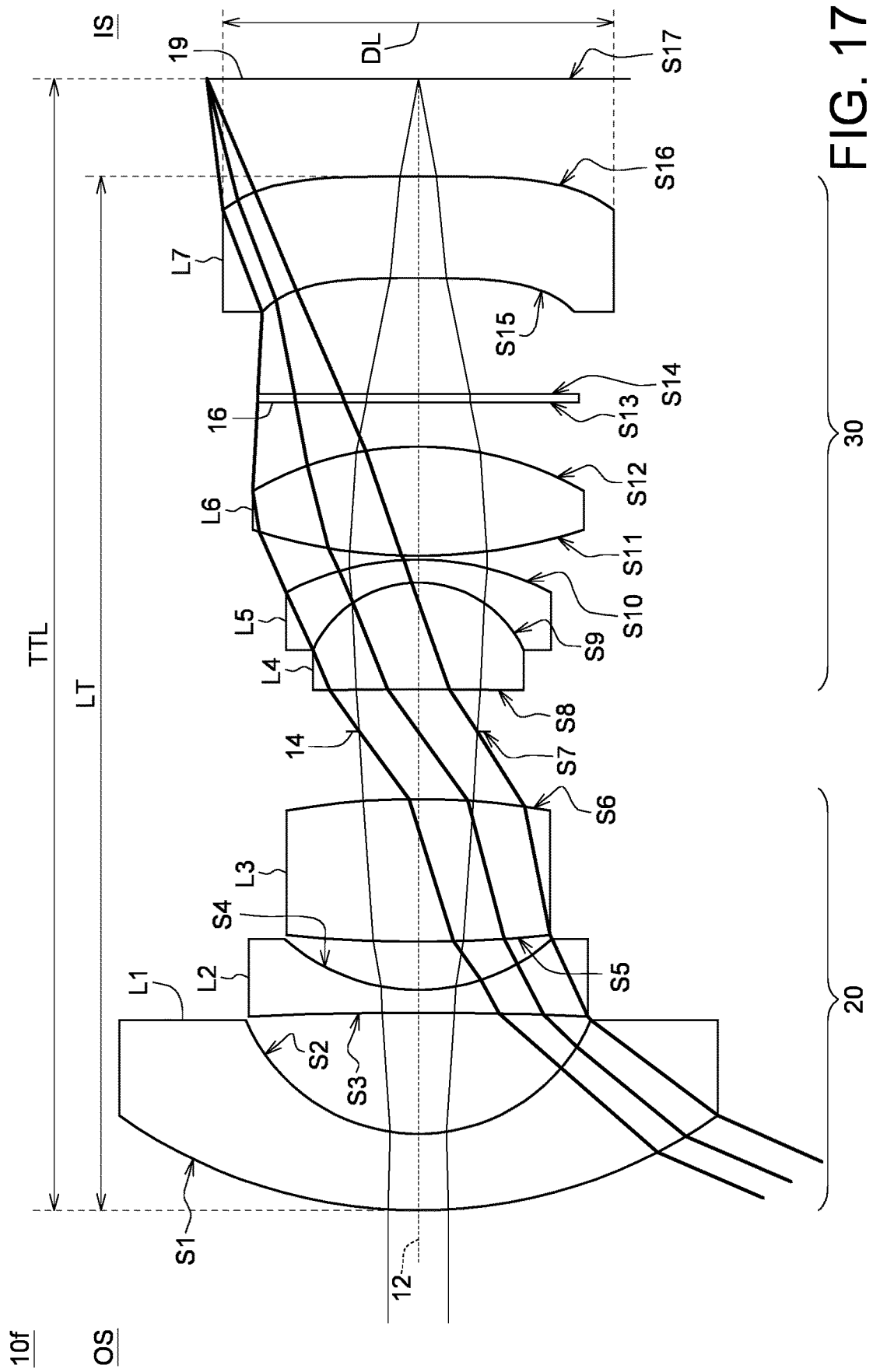
FIG. 17 is a schematic diagram of a lens assembly 10f according to an embodiment of the present invention.
Figure 18:
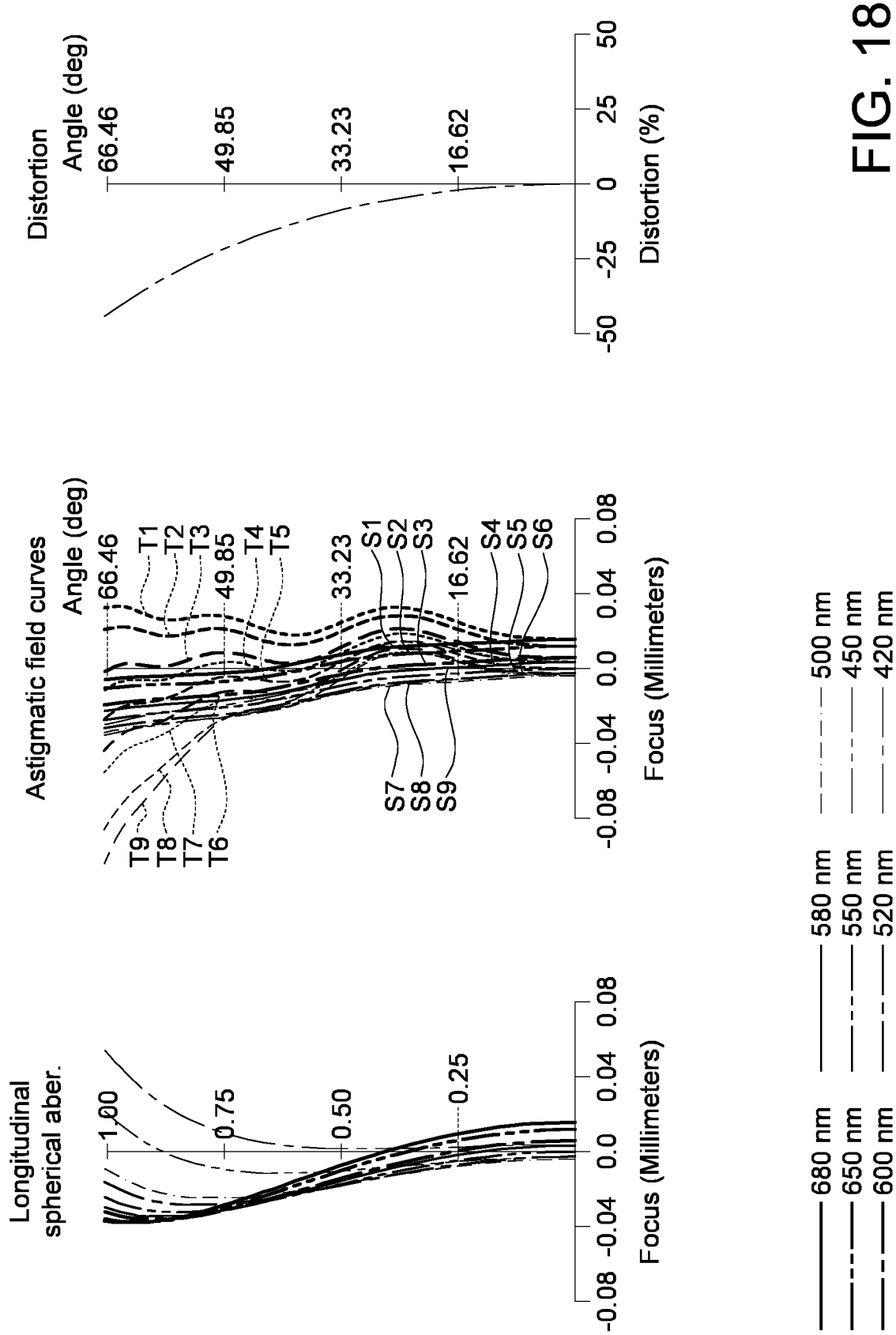
FIGS. 18~19 respectively are graphs of spherical aberration, astigmatic field and optical distortion of the lens assembly 10f and a characteristic graph of spectrum modulation conversion of a visible light.
Figure 19:
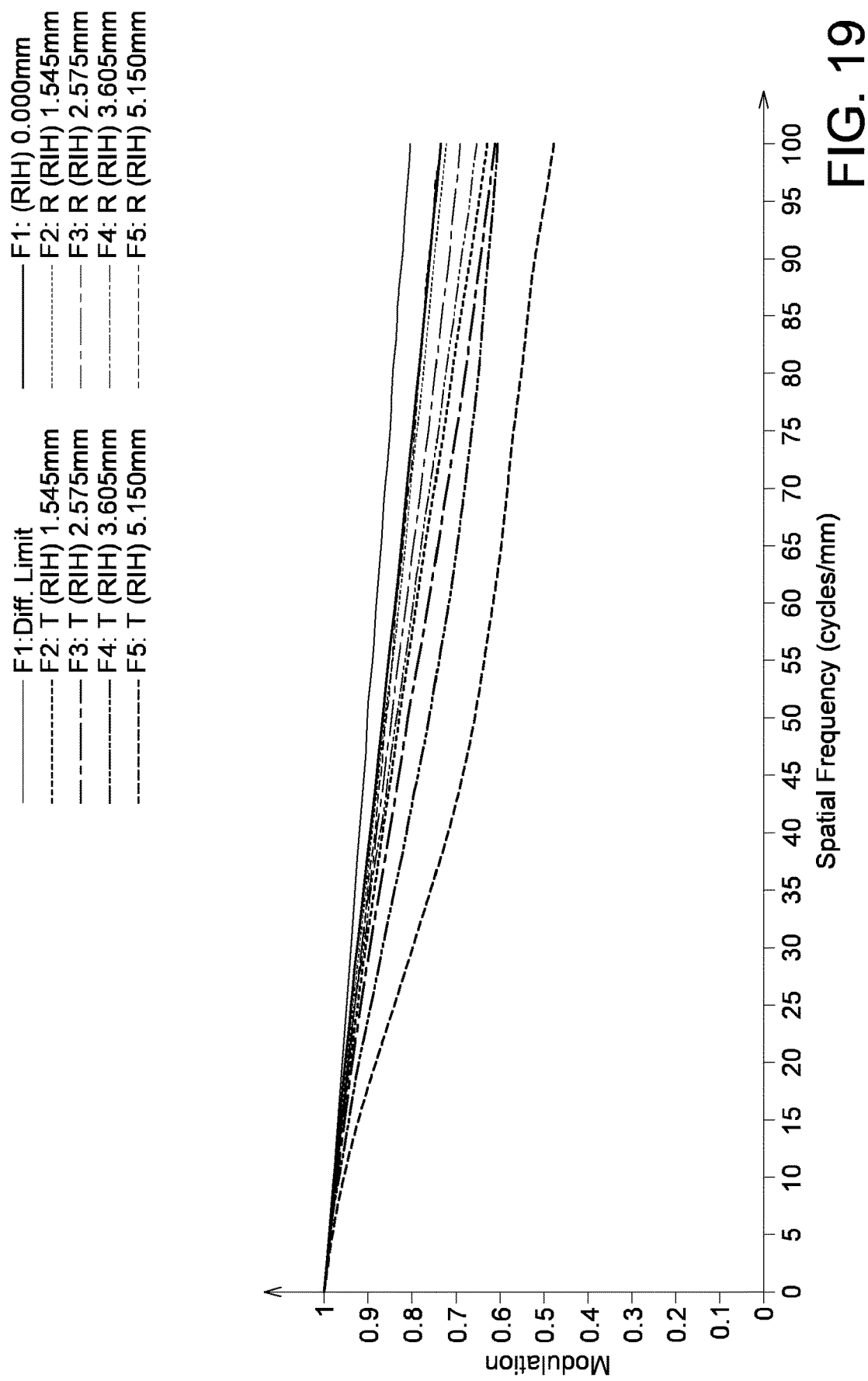

The lens assembly according to a sixth embodiment of the present invention is disclosed below. FIG. 17 is a schematic diagram of a lens assembly 10f according to the sixth embodiment of the present invention. The first lens L1, the second lens L2 and the third lens L3 together form a first lens group (such as a front group) 20 with a negative refractive power. the fourth lens L4, the fifth lens L5, the sixth lens L6 and the seventh lens L7 together form a second lens group (such as a rear group) 30 with a positive refractive power. In the present embodiment, the refractive powers of the first lens L1 to the seventh lens L7 of the lens assembly 10d sequentially are: negative, negative, positive, positive, negative, positive, positive, all lenses are glass lenses, and the seventh lens is an aspheric lens, In the present embodiment, the aspheric lenses are formed by the glass molding method, and the filter 16 is disposed between the sixth lens L6 and the seventh lens L7. In an embodiment, aspheric glass lenses can be replaced by aspheric plastics lenses. In the present embodiment, the fourth lens L4 and the fifth lens L5 form a combined lens, but the present invention is not limited thereto. In the present embodiment, the surface S1 has a diameter of 14.6 mm, the surface S16 has a diameter of 9.53 mm. The design parameters of the lens and the peripheral elements of the lens assembly 10f are listed in Table 11.

TABLE 11

F/# = 2.8; TTL = 27.8 (mm); LT = 25.4 (mm)
EFL = 4.03 (mm); FOV = 133度; DL/LT = 0.375
D1/DL = 1.532; IMH = 5.15 (mm); EFL/LT = 0.159

| Surface | Radius of curvature (mm) | Interval (mm) | Refractive power | Abbe number | Element |
|---|---|---|---|---|---|
| S1 | 12.69 | 1.88 | 1.73 | 54.67 | L1 (convex-concave) |
| S2 | 4.58 | 2.99 | | | |
| S3 | −85.96 | 0.55 | 1.50 | 81.61 | L2 (bi-concave) |
| S4 | 4.88 | 1.18 | | | |
| S5 | 32.50 | 3.50 | 2.00 | 25.458 | L3 (bi-convex) |
| S6 | −18.84 | 1.66 | | | |
| S7 | INF. | 1.04 | | | Aperture 14 |
| S8 | −69.37 | 2.64 | 1.60 | 65.44 | L4 (concave-convex) |
| S9 | −2.80 | 0.55 | 1.70 | 30.13 | L5 (convex-concave) |
| S10 | −6.91 | 0.10 | | | |
| S11 | 13.16 | 2.67 | 1.50 | 81.61 | L6 (bi-convex) |
| S12 | −8.06 | 1.09 | | | |
| S13 | INF. | 0.21 | 1.523 | 54.52 | Filter 16 |
| S14 | INF. | 2.84 | | | |
| S15* | −40.34 | 2.51 | 1.805 | 40.65 | L7 (aspheric) |
| S16* | −146.60 | 2.40 | | | |
| S17 | | | | | Image plane 19 |

The aspheric coefficient and the conic coefficient of each order term of the aspheric lens surface according to the sixth embodiment of the present invention are listed in Table 12.

TABLE 12

| | S15* | S16* |
|---|---|---|
| k | 99 | −99 |
| A | −1.86E−03 | −1.15E−03 |
| B | −1.05E−04 | −1.26E−05 |
| C | 2.82E−05 | 1.12E−06 |
| D | −5.11E−06 | −1.77E−07 |
| E | 4.61E−07 | 1.14E−08 |
| F | −2.14E−08 | −3.51E−10 |
| G | 3.99E−10 | 4.11E−12 |
| H | 0.00E+00 | 0.00E+00 |
| I | 0.00E+00 | 0.00E+00 |

The interval of the surface S1 is the distance from the surface S1 to the surface S2 on the optical axis 12. The interval of the surface S2 is the distance on the optical axis 12 from the surface S2 to the surface S3. The interval of the surface S16 is the distance on the optical axis 12 from the surface S16 to the image plane 19 of a visible light at an effective focal length. The lens assembly includes at least three lenses whose Abbe numbers are greater than 60. The rear group includes at least two lenses whose Abbe numbers are greater than 60. The present embodiment, the total length (LT) of the lens assembly is smaller than 26 mm.

FIGS. 2~3, FIGS. 5~6, FIGS. 8~9, FIGS. 12~13, FIGS. 15~16, FIGS. 18~19 respectively are the imaging optical simulation charts of the lens assemblies 10a, 10b, 10c, 10d, 10e, and 10f of the present embodiment. From the left to the right of each of FIG. 2, FIG. 5, FIG. 8, FIG. 12, FIG. 15, and FIG. 18, the spherical aberration, the astigmatic field and the optical distortion graphs of the lens assemblies 10a, 10b, 10c, 10d, 10e, and 10f are shown in order. FIG. 3, FIG. 6, FIG. 9, FIG. 13, FIG. 16, and FIG. 19 respectively are the modulation transfer function (MTF) characteristics diagrams of the optical imaging system of the lens assemblies 10a, 10b, 10c, 10d, 10e, and 10f and are used for measuring and evaluating the contrast and sharpness of the imaging system. The vertical axis of the MTF characteristics diagram represents contrast transfer rate (from 0 to 1), the horizontal axis represents spatial frequency (cycles/mm; lp/mm; line pairs per mm). In theory, a perfect imaging system can 100% represent the line contrast of the photographed object. However, in actual situation, the contrast transfer rate of the vertical axis of the imaging system is smaller than 1. Generally speaking, it is much harder to get a fine reduction in the edge area than in the central area. FIGS. 2~3, FIGS. 5~6, FIGS. 8~9, FIGS. 12~13, FIGS. 15~16, FIGS. 18~19 show that all the data as illustrated in the charts are within the standard range. Therefore, it can be verified that the lens assemblies 10a, 10b, 10c, 10d, 10e, and 10f of the present embodiment possess excellent quality of optical imaging.

FIGS. 10a-10f respectively are comparison graphs of the results obtained using the design values of the lens assembly 10a, 10b, 10c, 10d, 10e, and 10f vs the results obtained using different projection methods. The values of the half field of view HFOV, the image height IMH and the full field of view FOV of the lenses 10a, 10b and 10c are listed in Table 13 to Table 18. IMH represents a half of the absolute value of the image circle of each embodiment, and the bottommost value of the IMH column is IMHMAX representing a half of the maximum image circle. HFOV represents the half field of view of the optical lens corresponding to IMH, and the bottommost value of the HFOV column represents the maximum value of the HFOV. FOV represents the full field of view of the optical lens corresponding to HFOV, and the bottommost value of the FOV column represents a maximum value of FOV. It can be known from Table 7 to Table 9 that the lenses of the embodiments of the present invention satisfy the following conditions: FOV≈110°, IMH≈4.32 mm, FOV≈28°, IMH<1.92 mm.

TABLE 13

|    | HFOV (°) | IMH (mm) | IMH/IMHMAX | FOV (°) | Perspective projection method | Stereographic projection method |
|----|----------|----------|------------|---------|-------------------------------|--------------------------------|
| 0  | 0        | 0        | 0          | 0       | 0                             | 0                              |
| 1  | 8.060    | 0.515    | 0.100      | 16.110  | 0.515                         | 0.513                          |
| 2  | 15.810   | 1.030    | 0.200      | 31.620  | 1.031                         | 1.011                          |
| 3  | 23.070   | 1.545    | 0.300      | 46.140  | 1.550                         | 1.486                          |
| 4  | 29.760   | 2.060    | 0.400      | 59.530  | 2.081                         | 1.934                          |
| 5  | 35.960   | 2.575    | 0.500      | 71.930  | 2.641                         | 2.363                          |
| 6  | 41.810   | 3.090    | 0.600      | 83.620  | 3.256                         | 2.781                          |
| e  | 47.540   | 3.605    | 0.700      | 95.080  | 3.978                         | 3.206                          |
| 8  | 53.520   | 4.120    | 0.800      | 107.030 | 4.923                         | 3.671                          |
| 9  | 56.010   | 4.320    | 0.839      | 112.020 | 5.399                         | 3.872                          |
| 10 | 60.280   | 4.635    | 0.900      | 120.570 |                               | 4.227                          |
| 11 | 68.760   | 5.150    | 1.000      | 137.520 |                               | 4.981                          |

TABLE 14

|    | HFOV (°) | IMH (mm) | IMH/IMHMAX | FOV (°) | Perspective projection method | Stereographic projection method |
|----|----------|----------|------------|---------|-------------------------------|--------------------------------|
| 0  | 0        | 0        | 0          | 0       | 0                             | 0                              |
| 1  | 7.900    | 0.515    | 0.100      | 15.810  | 0.516                         | 0.514                          |
| 2  | 15.630   | 1.030    | 0.200      | 31.270  | 1.041                         | 1.021                          |
| 3  | 22.980   | 1.545    | 0.300      | 45.970  | 1.578                         | 1.512                          |
| 4  | 29.790   | 2.060    | 0.400      | 59.570  | 2.130                         | 1.979                          |
| 5  | 36.030   | 2.575    | 0.500      | 72.070  | 2.706                         | 2.420                          |
| 6  | 41.870   | 3.090    | 0.600      | 83.740  | 3.335                         | 2.846                          |
| e  | 47.570   | 3.605    | 0.700      | 95.150  | 4.070                         | 3.279                          |

TABLE 14-continued

|    | HFOV (°) | IMH (mm) | IMH/IMHMAX | FOV (°) | Perspective projection method | Stereographic projection method |
|----|----------|----------|------------|---------|-------------------------------|--------------------------------|
| 8  | 53.540   | 4.120    | 0.800      | 107.070 | 5.035                         | 3.754                          |
| 9  | 56.030   | 4.320    | 0.839      | 112.070 | 5.522                         | 3.959                          |
| 10 | 60.320   | 4.635    | 0.900      | 120.650 | 6.528                         | 4.324                          |
| 11 | 68.880   | 5.150    | 1.000      | 137.760 |                               | 5.102                          |

TABLE 15

|    | HFOV (°) | IMH (mm) | IMH/IMHMAX | FOV (°) | Perspective projection method | Stereographic projection method |
|----|----------|----------|------------|---------|-------------------------------|--------------------------------|
| 0  | 0        | 0        | 0          | 0       | 0                             | 0                              |
| 1  | 8.010    | 0.515    | 0.100      | 16.030  | 0.516                         | 0.513                          |
| 2  | 15.760   | 1.030    | 0.200      | 31.520  | 1.034                         | 1.014                          |
| 3  | 23.040   | 1.545    | 0.300      | 46.080  | 1.558                         | 1.494                          |
| 4  | 29.780   | 2.060    | 0.400      | 59.550  | 2.097                         | 1.948                          |
| 5  | 36.020   | 2.575    | 0.500      | 72.050  | 2.664                         | 2.382                          |
| 6  | 41.920   | 3.090    | 0.600      | 83.850  | 3.290                         | 2.807                          |
| 7  | 47.680   | 3.605    | 0.700      | 95.370  | 4.024                         | 3.238                          |
| 8  | 53.590   | 4.120    | 0.800      | 107.170 | 4.968                         | 3.701                          |
| 9  | 56.000   | 4.320    | 0.839      | 112.000 | 5.432                         | 3.896                          |
| 10 | 60.060   | 4.635    | 0.900      | 120.130 | —                             | 4.236                          |
| 11 | 68.000   | 5.150    | 1.000      | 136.000 | —                             | 4.943                          |

TABLE 16

|    | HFOV (°) | IMH (mm) | IMH/IMHMAX | FOV (°) | Perspective projection method | Stereographic projection method |
|----|----------|----------|------------|---------|-------------------------------|--------------------------------|
| 0  | 0        | 0        | 0          | 0       | 0                             | 0                              |
| 1  | 6.990    | 0.515    | 0.100      | 13.980  | 0.518                         | 0.516                          |
| 2  | 13.960   | 1.030    | 0.200      | 27.920  | 1.049                         | 1.034                          |
| 3  | 20.900   | 1.545    | 0.300      | 41.800  | 1.612                         | 1.557                          |
| 4  | 27.790   | 2.060    | 0.400      | 55.580  | 2.225                         | 2.088                          |
| 5  | 34.620   | 2.575    | 0.500      | 69.230  | 2.914                         | 2.631                          |
| 6  | 41.360   | 3.090    | 0.600      | 82.720  | 3.716                         | 3.187                          |
| 7  | 48.000   | 3.605    | 0.700      | 96.010  | 4.688                         | 3.759                          |
| 8  | 54.520   | 4.120    | 0.800      | 109.030 | 5.922                         | 4.350                          |
| 9  | 57.010   | 4.320    | 0.839      | 114.010 | 6.502                         | 4.585                          |
| 10 | 60.880   | 4.635    | 0.900      | 121.760 | 7.577                         | 4.961                          |
| 11 | 67.090   | 5.150    | 1.000      | 134.190 | —                             | 5.597                          |

TABLE 17

|    | HFOV (°) | IMH (mm) | IMH/IMHMAX | FOV (°) | Perspective projection method | Stereographic projection method |
|----|----------|----------|------------|---------|-------------------------------|--------------------------------|
| 0  | 0        | 0        | 0          | 0       | 0                             | 0                              |
| 1  | 7.080    | 0.515    | 0.100      | 14.150  | 0.519                         | 0.517                          |
| 2  | 14.140   | 1.030    | 0.200      | 28.270  | 1.052                         | 1.036                          |
| 3  | 21.160   | 1.545    | 0.300      | 42.320  | 1.616                         | 1.560                          |
| 4  | 28.130   | 2.060    | 0.400      | 56.260  | 2.232                         | 2.092                          |
| 5  | 35.030   | 2.575    | 0.500      | 70.060  | 2.926                         | 2.635                          |
| 6  | 41.850   | 3.090    | 0.600      | 83.690  | 3.739                         | 3.193                          |
| 7  | 48.560   | 3.605    | 0.700      | 97.120  | 4.729                         | 3.766                          |

TABLE 17-continued

|  | HFOV (°) | IMH (mm) | IMH/IMHMAX | FOV (°) | Perspective projection method | Stereographic projection method |
|---|---|---|---|---|---|---|
| 8 | 55.160 | 4.120 | 0.800 | 110.310 | 5.998 | 4.361 |
| 9 | 57.690 | 4.320 | 0.839 | 115.380 | 6.601 | 4.599 |
| 10 | 61.640 | 4.635 | 0.900 | 123.270 | 7.734 | 4.981 |
| 11 | 68.000 | 5.150 | 1.000 | 136.000 | — | 5.632 |

TABLE 18

|  | HFOV (°) | IMH (mm) | IMH/IMHMAX | FOV (°) | Perspective projection method | Stereographic projection method |
|---|---|---|---|---|---|---|
| 0 | 0 | 0 | 0 | 0 | 0 | 0 |
| 1 | 7.330 | 0.515 | 0.100 | 14.660 | 0.518 | 0.516 |
| 2 | 14.600 | 1.030 | 0.200 | 29.200 | 1.049 | 1.032 |
| 3 | 21.760 | 1.545 | 0.300 | 43.520 | 1.608 | 1.548 |
| 4 | 28.750 | 2.060 | 0.400 | 57.510 | 2.209 | 2.064 |
| 5 | 35.560 | 2.575 | 0.500 | 71.120 | 2.879 | 2.583 |
| 6 | 42.160 | 3.090 | 0.600 | 84.310 | 3.647 | 3.105 |
| 7 | 48.510 | 3.605 | 0.700 | 97.030 | 4.554 | 3.629 |
| 8 | 54.660 | 4.120 | 0.800 | 109.310 | 5.679 | 4.163 |
| 9 | 56.990 | 4.320 | 0.839 | 113.980 | 6.199 | 4.372 |
| 10 | 60.620 | 4.635 | 0.900 | 121.250 | 7.153 | 4.708 |
| 11 | 66.460 | 5.150 | 1.000 | 132.930 | — | 5.277 |

Through the design disclosed in the embodiments of the present invention, an image lens having the features of lightweight, lower manufacturing cost and better optical quality is provided. Based on the design that the optical lens assembly includes 6~11 lenses and that the distance (TTL) from the lens to the sensor is less than 30 mm, the optical lens assembly advantageously possesses the features of larger aperture, higher resolution, lighter weight, wider view angle, and larger target surface, the manufacturing cost can be reduced and the optical quality can be improved.

While the present invention has been described by way of example and in terms of the preferred embodiment (s), it is to be understood that the present invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly, comprising:
an aperture, wherein a spherical lens and an aspheric lens are disposed between the aperture and an image plane of the lens assembly; at least four lenses are disposed between the aperture and an image magnification side of the lens assembly; the quantity of the lenses with a refractive power is greater than 6 but less than 12; DL is the distance, in a direction perpendicular to an optical axis, between two edge turning points of a lens surface with a refractive power closest to the image plane of the lens assembly; LT is the length on the optical axis of the lens from the lens surface farthest from the image plane of the lens assembly to the lens surface closest to the image plane of the lens assembly,
wherein the lens assembly satisfies the following conditions: 6 mm<DL<20 mm, 0.3<DL/LT<0.6.

2. The lens assembly according to claim 1, wherein the lens assembly further comprises a combined lens formed of two lenses whose corresponding adjacent surfaces have identical radii of curvature; the aspheric lens is closer to the image plane of the lens assembly than the combined lens; at most one lens is disposed between the aspheric lens and the image plane of the lens assembly; the Abbe number of at least one lens of the combined lens and the Abbe number of the aspheric lens both are greater than 60.

3. The lens assembly according to claim 1, wherein the aperture value (F/#) of the lens assembly is greater than or equivalent to 2.6.

4. The lens assembly according to claim 1, wherein the lens assembly comprises two lenses whose Abbe numbers are larger than 60.

5. The lens assembly according to claim 1, wherein the lens assembly comprises another aspheric lens between the image magnification side and the aperture.

6. The lens assembly according to claim 1, wherein the lens assembly comprises a combined lens between an image reduction side and the aperture, and the difference in the radius of curvature between two adjacent surfaces of the combined lens is less than 0.005 mm.

7. The lens assembly according to claim 1, wherein LT is less than 26 mm.

8. The lens assembly according to claim 1, wherein TTL is the length on the optical axis of the lens from the lens surface farthest from the image plane of the lens assembly to the image plane of the lens assembly, and TTL is less than 30 mm.

9. The lens assembly according to claim 1, wherein the lenses arranged from the image magnification side to an image reduction side sequentially are: convex-concave, aspheric, plano-convex, convex-concave, bi-convex, convex-concave, bi-convex and aspheric lens.

10. The lens assembly according to claim 1, wherein the lenses arranged from the image magnification side to an image reduction side sequentially are: convex-concave, aspheric, plano-convex, bi-concave, bi-convex, bi-convex, convex-concave, bi-convex and aspheric lens.

11. The lens assembly according to claim 1, wherein the lenses arranged from the image magnification side to an image reduction side sequentially are: convex-concave, aspheric, concave-convex, convex-concave, bi-convex, convex-concave, bi-convex and aspheric lens.

12. The lens assembly according to claim 1, wherein the lens assembly satisfies one of the following conditions: (1) the refractive powers of the lenses arranged from the image magnification side to an image reduction side sequentially are: negative, negative, positive, negative, positive, negative, positive, positive; (2) the refractive powers of the lenses arranged from the image magnification side to the image reduction side sequentially are: negative, negative, positive, negative, positive, positive, negative, positive, positive; (3) the refractive powers of the lenses arranged from the image magnification side to the image reduction side sequentially are: negative, negative, positive, negative, positive, negative, positive, negative.

13. The lens assembly according to claim 1, wherein the lens assembly satisfies the condition: 6.5 mm<DL<20 mm, 0.3<DL/LT<0.6.

14. The lens assembly according to claim 1, wherein the lens assembly satisfies the condition: 6 mm<DL<20 mm, 0.38<DL/LT<0.6.

15. A lens assembly, comprising:
an aperture, wherein a spherical lens and an aspheric lens are disposed between the aperture and an image plane of the lens assembly; at least four lenses are disposed between the aperture and an object side of the lens assembly; the quantity of the lenses with a refractive power is greater than 5 but less than 12; EFL is the effective focal length of the lens assembly; LT is the length on the optical axis of the lens from the lens surface farthest from the image plane of the lens assembly to the lens surface closest to the image plane of the lens assembly, wherein the lens assembly satisfies the following conditions: 3 mm<EFL<5 mm, 0.1<EFL/LT<0.25.

* * * * *